US010430753B2

(12) United States Patent
Felix et al.

(10) Patent No.: US 10,430,753 B2
(45) Date of Patent: Oct. 1, 2019

(54) SYSTEM AND METHOD FOR INTERNATIONAL MERCHANDISE RETURN SERVICE

(71) Applicant: United States Postal Service, Washington, DC (US)

(72) Inventors: Shea R. Felix, Falls Church, VA (US); Kate A. Sobel, Washington, DC (US); Rachel E. Clausen, Washington, DC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 1244 days.

(21) Appl. No.: 14/568,041

(22) Filed: Dec. 11, 2014

(65) Prior Publication Data
US 2015/0161562 A1 Jun. 11, 2015

Related U.S. Application Data

(63) Continuation of application No. 13/787,668, filed on Mar. 6, 2013, now Pat. No. 8,918,341.

(51) Int. Cl.
*G06Q 10/08* (2012.01)
*G06Q 40/02* (2012.01)
(Continued)

(52) U.S. Cl.
CPC ......... *G06Q 10/0837* (2013.01); *G06Q 10/00* (2013.01); *G06Q 10/0831* (2013.01);
(Continued)

(58) Field of Classification Search
CPC ............... G06Q 10/0837; G06Q 10/00; G06Q 10/0831; G06Q 10/0832; G06Q 10/0833;
(Continued)

(56) References Cited

U.S. PATENT DOCUMENTS 5,968,110 A * 10/1999 Westrope ............... G06Q 30/02
238/381
6,233,565 B1 5/2001 Lewis et al.
(Continued)

FOREIGN PATENT DOCUMENTS

CN 101496057 A 7/2009
CN 101553836 A 10/2009
(Continued)

OTHER PUBLICATIONS

Yao, "Pricing for shipping services of online retailers: Analytical and empirical approaches", published by Elsevier, on Jan. 25, 2012, all pages (Year: 2012).*

(Continued)

*Primary Examiner* — Kevin H Flynn
*Assistant Examiner* — Omar Zeroual
(74) *Attorney, Agent, or Firm* — Knobbe Martens Olson & Bear LLP

(57) ABSTRACT

A system and method for generating a return label for merchandise being returned from a buyer or consumer in a first country to a merchant in a second country. A name and address of a consumer in the first country desiring to return merchandise and merchant or seller information including a merchant identifier is received. An address for receiving returns for the merchant or seller in the second country is accessed based on the merchant information. One or more machine readable identifiers for use by a first country carrier and for use by a second country carrier based at least on the consumer information, and information for routing the return merchandise are generated. A return label for merchandise being returned from the consumer to the merchant is generated. The return label can include the machine readable identifiers and a customs declaration for the merchandise.

28 Claims, 18 Drawing Sheets

(51) Int. Cl.
*G06Q 40/00* (2012.01)
*G06Q 30/00* (2012.01)
*G06Q 20/00* (2012.01)
*G06Q 10/00* (2012.01)

(52) U.S. Cl.
CPC ..... *G06Q 10/0832* (2013.01); *G06Q 10/0833* (2013.01); *G06Q 20/00* (2013.01); *G06Q 30/00* (2013.01); *G06Q 40/00* (2013.01); *G06Q 40/02* (2013.01)

(58) Field of Classification Search
CPC ........ G06Q 20/00; G06Q 30/00; G06Q 40/00; G06Q 40/02
See application file for complete search history.

(56) References Cited

U.S. PATENT DOCUMENTS

| | | | | |
|---|---|---|---|---|
| 6,463,421 | B2* | 10/2002 | Junger | G06Q 10/083 705/22 |
| 7,058,581 | B1* | 6/2006 | Young | G06Q 10/08 221/7 |
| D535,690 | S | 1/2007 | Fabel et al. | |
| D561,825 | S | 2/2008 | Davidson et al. | |
| 7,455,226 | B1* | 11/2008 | Hammond | G06Q 10/087 235/385 |
| D594,061 | S | 6/2009 | Kudimi | |
| 7,577,598 | B2 | 8/2009 | Rousseau et al. | |
| RE40,924 | E | 9/2009 | Nicholls et al. | |
| 7,596,500 | B1* | 9/2009 | Thompson | G06Q 30/0284 705/1.1 |
| D602,166 | S | 10/2009 | Coyne, III et al. | |
| 7,725,406 | B2 | 5/2010 | Black et al. | |
| 7,853,480 | B2 | 12/2010 | Taylor et al. | |
| 7,937,331 | B2 | 5/2011 | Mack | |
| D641,040 | S | 7/2011 | Tetrault | |
| 8,041,607 | B1 | 10/2011 | Coursol | |
| 8,046,273 | B2* | 10/2011 | Welter | G06Q 10/087 705/26.8 |
| D650,009 | S | 12/2011 | Tetrault | |
| 8,078,485 | B1 | 12/2011 | Kraehmueller et al. | |
| 8,156,007 | B1* | 4/2012 | Anthony | G06Q 10/0837 705/22 |
| D660,355 | S | 5/2012 | Tetrault | |
| D662,976 | S | 7/2012 | Tetrault | |
| D664,195 | S | 7/2012 | Rosenthal et al. | |
| 8,279,064 | B2 | 10/2012 | Sansone et al. | |
| 8,360,313 | B1 | 1/2013 | Leon et al. | |
| 8,407,110 | B1 | 3/2013 | Joseph et al. | |
| 8,505,978 | B1 | 8/2013 | Leon | |
| 8,584,107 | B1 | 11/2013 | Skaistis | |
| 8,701,977 | B2 | 4/2014 | Spaulding | |
| 9,984,351 | B1* | 5/2018 | Antony | G06Q 10/08 |
| 2002/0010689 | A1* | 1/2002 | Tibbs | G06Q 10/08 705/408 |
| 2002/0013739 | A1 | 1/2002 | O'Donnell et al. | |
| 2002/0019785 | A1* | 2/2002 | Whitman | G06Q 10/087 705/28 |
| 2002/0029155 | A1 | 3/2002 | Hetzel et al. | |
| 2002/0032573 | A1 | 3/2002 | Williams et al. | |
| 2002/0032612 | A1* | 3/2002 | Williams | G06Q 10/08 705/26.1 |
| 2002/0032668 | A1 | 3/2002 | Kohler et al. | |
| 2002/0120527 | A1* | 8/2002 | Lam | G06Q 20/12 705/26.61 |
| 2002/0152093 | A1* | 10/2002 | Chalmers | G06Q 10/08 705/26.1 |
| 2002/0152174 | A1* | 10/2002 | Woods | G06Q 10/08 705/60 |
| 2002/0178074 | A1 | 11/2002 | Bloom | |
| 2003/0105704 | A1 | 6/2003 | Sundel | |
| 2003/0135432 | A1* | 7/2003 | McIntyre | G06Q 10/087 705/28 |
| 2003/0144971 | A1* | 7/2003 | Das | G06Q 10/08 705/401 |
| 2003/0195784 | A1* | 10/2003 | Smith, Jr. | G06Q 10/06 705/28 |
| 2003/0195843 | A1* | 10/2003 | Matsuda | G06Q 20/04 705/39 |
| 2003/0217017 | A1* | 11/2003 | Willoughby | G06Q 30/02 705/404 |
| 2003/0220855 | A1* | 11/2003 | Lam | G06Q 20/102 705/34 |
| 2003/0225625 | A1* | 12/2003 | Chew | G06Q 20/209 705/24 |
| 2004/0049446 | A1 | 3/2004 | Seljeseth | |
| 2004/0083233 | A1* | 4/2004 | Willoughby | G06Q 10/08 |
| 2004/0093312 | A1 | 5/2004 | Cordery et al. | |
| 2004/0122690 | A1* | 6/2004 | Willoughby | G06Q 10/08 705/337 |
| 2004/0148052 | A1* | 7/2004 | Ferguson | G06Q 10/08 700/213 |
| 2004/0172260 | A1* | 9/2004 | Junger | G06Q 10/0833 705/21 |
| 2004/0186811 | A1 | 9/2004 | Gullo et al. | |
| 2004/0193438 | A1* | 9/2004 | Stashluk, Jr. | G06Q 10/08 705/304 |
| 2004/0194056 | A1* | 9/2004 | Combs | G06Q 30/016 717/104 |
| 2004/0212833 | A1* | 10/2004 | Taskett | G06Q 10/08 358/1.18 |
| 2004/0215480 | A1 | 10/2004 | Kadaba | |
| 2004/0215531 | A1* | 10/2004 | Stashluk, Jr. | G06Q 10/087 705/28 |
| 2004/0243690 | A1* | 12/2004 | Hancock | G06Q 10/06312 709/219 |
| 2004/0267642 | A1* | 12/2004 | Stenz | G06Q 10/087 705/28 |
| 2005/0060165 | A1* | 3/2005 | Knight | G06Q 10/08 705/22 |
| 2005/0060259 | A1 | 3/2005 | Holmes et al. | |
| 2005/0061878 | A1 | 3/2005 | Barenburg et al. | |
| 2005/0086132 | A1 | 4/2005 | Kanitz et al. | |
| 2005/0114221 | A1* | 5/2005 | Walters | G06Q 10/08 705/340 |
| 2005/0119786 | A1 | 6/2005 | Kadaba | |
| 2005/0144059 | A1* | 6/2005 | Schuessler | G06Q 10/08 705/333 |
| 2005/0149453 | A1* | 7/2005 | Amling | G06Q 10/08 705/60 |
| 2005/0192816 | A1* | 9/2005 | Wechsel | G06Q 10/08 705/28 |
| 2005/0222853 | A1* | 10/2005 | Black | G06Q 10/08 705/331 |
| 2005/0222911 | A1* | 10/2005 | Kerker | G06Q 30/02 705/26.1 |
| 2005/0228681 | A1* | 10/2005 | McMahon | G06Q 10/08 705/333 |
| 2005/0248806 | A1 | 11/2005 | Klein et al. | |
| 2005/0264832 | A1 | 12/2005 | Baum et al. | |
| 2005/0283406 | A1 | 12/2005 | Kuelbs et al. | |
| 2006/0036504 | A1* | 2/2006 | Allocca | G06Q 30/06 705/26.1 |
| 2006/0149577 | A1* | 7/2006 | Stashluk, Jr. | G06Q 10/0837 705/340 |
| 2006/0237547 | A1 | 10/2006 | Barenburg et al. | |
| 2007/0043579 | A1 | 2/2007 | Kent et al. | |
| 2007/0055639 | A1* | 3/2007 | Garvey | B42D 15/006 705/410 |
| 2007/0095904 | A1 | 5/2007 | Barta et al. | |
| 2007/0156281 | A1 | 7/2007 | Leung et al. | |
| 2007/0192215 | A1 | 8/2007 | Taylor et al. | |
| 2007/0299791 | A1* | 12/2007 | Mack | G06Q 10/08 705/402 |
| 2008/0071627 | A1 | 3/2008 | Junger | |
| 2008/0071633 | A1 | 3/2008 | Ozkan et al. | |
| 2008/0097933 | A1 | 4/2008 | Awaida et al. | |
| 2008/0120129 | A1* | 5/2008 | Seubert | G06Q 10/06 705/35 |

(56) References Cited

U.S. PATENT DOCUMENTS

| | | | |
|---|---|---|---|
| 2008/0126157 A1* | 5/2008 | Rousso | G06Q 10/0631 705/348 |
| 2008/0162305 A1 | 7/2008 | Rousso et al. | |
| 2008/0255863 A1* | 10/2008 | Mack | G06Q 10/08 705/1.1 |
| 2008/0288274 A1* | 11/2008 | Roccagiovine | G06Q 10/08 705/1.1 |
| 2008/0294536 A1* | 11/2008 | Taylor | G06Q 10/08 705/28 |
| 2008/0302866 A1* | 12/2008 | Baugh | G06Q 10/08 235/375 |
| 2009/0037203 A1 | 2/2009 | Gallagher et al. | |
| 2009/0094082 A1 | 4/2009 | Willoughby | |
| 2009/0138379 A1 | 5/2009 | Scheman | |
| 2009/0144070 A1 | 6/2009 | Psota et al. | |
| 2009/0171802 A1 | 7/2009 | Raygoza | |
| 2009/0172035 A1 | 7/2009 | Lessing et al. | |
| 2009/0322510 A1 | 12/2009 | Berger et al. | |
| 2010/0057596 A1* | 3/2010 | Sundel | G06Q 10/0831 705/31 |
| 2010/0057678 A1 | 3/2010 | Fein et al. | |
| 2010/0067041 A1* | 3/2010 | Endruscheit | G07B 17/00508 358/1.15 |
| 2010/0100233 A1 | 4/2010 | Lu | |
| 2010/0145754 A1* | 6/2010 | Rahman | G06Q 10/06 705/340 |
| 2010/0299278 A1* | 11/2010 | Kriss | G06Q 10/08 705/332 |
| 2010/0300944 A1 | 12/2010 | Carpenter et al. | |
| 2010/0332284 A1 | 12/2010 | Hilbush et al. | |
| 2011/0016043 A1 | 1/2011 | Dornseif | |
| 2011/0029429 A1* | 2/2011 | Whitehouse | G06Q 20/10 705/39 |
| 2011/0050397 A1 | 3/2011 | Cova | |
| 2011/0050423 A1 | 3/2011 | Cova et al. | |
| 2011/0066549 A1* | 3/2011 | Whitehouse | G06Q 10/0831 705/39 |
| 2011/0106714 A1* | 5/2011 | Junger | G06Q 20/203 705/304 |
| 2011/0173129 A1 | 7/2011 | Mack | |
| 2011/0213700 A1 | 9/2011 | Sant'Anselmo | |
| 2011/0242554 A1 | 10/2011 | Farry et al. | |
| 2012/0030070 A1 | 2/2012 | Keller et al. | |
| 2013/0006821 A1 | 1/2013 | Pirrello et al. | |
| 2013/0090998 A1 | 4/2013 | Shimogori | |
| 2013/0218723 A1* | 8/2013 | Masud | G06Q 50/28 705/26.62 |
| 2013/0304663 A1* | 11/2013 | Whitehouse | G06Q 10/0833 705/333 |
| 2014/0058971 A1* | 2/2014 | Muppirala | G06Q 10/0831 705/333 |
| 2014/0172735 A1 | 6/2014 | Jena et al. | |
| 2014/0279440 A1* | 9/2014 | Felix | G06Q 10/0831 705/39 |
| 2015/0019454 A1 | 1/2015 | Helseth | |
| 2018/0053152 A1* | 2/2018 | Chalmers | G06Q 10/08 |

FOREIGN PATENT DOCUMENTS

| | | |
|---|---|---|
| CN | 101755245 A | 6/2010 |
| CN | 101789200 A | 7/2010 |
| CN | 101894332 A | 11/2010 |
| WO | WO 2008/002494 A2 | 1/2008 |
| WO | WO 2012/178047 A1 | 12/2012 |

OTHER PUBLICATIONS

International Search Report and Written Opinion dated Aug. 5, 2016 for International Patent Application No. PCT/US16/30585.

International Search Report and Written Opinion dated Jan. 6, 2015 for International Patent Application No. PCT/US14/19929 which shares priority of U.S. Appl. No. 13/787,668, filed Mar. 6, 2013, with captioned U.S. Appl. No. 14/568,041. The International Search Report cites three (3) U.S. patent publications that are previously disclosed in the instant U.S. Appl. No. 14/568,041.

Extended European Search Report dated Jul. 13, 2016 for European Patent Application No. EP 14 759 721.5.

International Search Report and Written Opinion dated Jul. 14, 2014 for International Patent Application No. PCT/US2014/024192.

Industrial Offline E-Postage Systems, In: Electronic Postage Systems. Advances in Information Security, vol. 26, Table of Contents and pp. 127-166, Springer, Boston, MA (2007).

* cited by examiner

FIG. 5A

Expedited Parcel --- USA   Colis Accéléré É.-U.

CANADA POST
POSTES CANADA
Postage Paid
Port payé
2793431

2

MERCHANDISE RETURN LABEL
PERMIT NO.

FROM
DE

Telephone No.
N° de téléphone

TO
À

Telephone No.
N° de téléphone

CANADA
In case of non-delivery, return at sender's expense

UNITED STATES
En cas de non-livraison, renvoyez aux frais l'expéditeur

POSTAGE DUE
$
COMPUTED BY
USPS DELIVERY UNIT

PRIORITY MAIL
UNITED STATES POSTAL SERVICE®

USPS DELIVERY CONFIRMATION

| Itemized List of Contents and County of Origin Manufacture Désignation détaillée du contenu et pays de fabrication | Kg | Value ($CAD) Valeur (CAD$) |
|---|---|---|
| Return Merchandise Merchandises de retours | | |
| Total Value Valeur Totale | | $0 |
| Signature of Sender Signature de l'expéditeur | Date | |

Sender warrants that this item does not contain dangerous goods.
L'expéditeur garantit que cet envoi ne contient pas de matières dangereuses.
Customs Declaration CN23   Shipping Label   Déclaration es douane   CN23 Étiquette d'expédition Method of Payment: Account
Mode de paiement Porter au compte
No Manifest Required/Manifeste non requis

| Individual Label Element | Significance | Example |
|---|---|---|
| Utilization of a tracking barcode with or without utilization of USPS delivery scanning indicators including:<br>1) "railroad tracks" and/or<br>2) USPS registered trademark "USPS DELIVERY CONFIRMATION®", or<br>3) USPS trademark "USPS TRACKING" over the barcode | Enables end-to-end tracking, from acceptance in the foreign country by the foreign operator/post to delivery by USPS. Railroad tracks and verbiage over the barcode are scanning indicators for USPS handlers. Certain barcodes may or may not include routing information (routes the package to the delivery post office's 5-digit ZIP code) | USPS DELIVERY CONFIRMATION — 2. "USPS DELIVERY CONFIRMATION"<br>1. Railroad tracks<br>CX 484 651 843 CA<br>USPS TRACKING # — 3. "USPS TRACKING#"<br>9114 9010 7574 2164 8000 18 |
| Utilization of "Merchandise Return Label" with USPS permit holder information | Ensures the return item's postage amount is deducted from the correct permit account holder's account | MERCHANDISE RETURN LABEL<br>PERMIT NO. 22222   Washington DC 20410<br>Test Merchant   901 D ST. NW |
| Utilization of USPS registered trademarks "PRIORITY MAIL UNITED STATES POSTAL SERVICE" and Sonic Eagle design | Identifies the return item's service level | PRIORITY MAIL<br>UNITED STATES POSTAL SERVICE® |
| Utilization of USPS registered trademarks "PRIORITY MAIL UNITED STATES POSTAL SERVICE" and Sonic Eagle design in conjunction with "postage due" language | Identifies the return item's service level and allows the USPS clerk to write the calculated postage amount on the mail piece prior to delivery and deduction from the permit holder's account | PRIORITY MAIL<br>UNITED STATES POSTAL SERVICE®<br>POSTAGE DUE<br>$<br>COMPUTED BY USPS DELIVERY UNIT |
| Utilization of a "TO" address that is either a US address or a USPS Postage Due Unit address | | POSTAGE DUE UNIT<br>US POSTAL SERVICE<br>901 D ST. NW<br>Ste. 101<br>WASHINGTON DC 20410-0001<br>UNITED STATES |
| Utilization of a foreign "FROM" address | | Name<br>223 W. OAK ST.<br>TORONTO ON M5G 1H1 |
| Utilization of a section dedicated to customs which may or may not reflect "CN 23" | Provides US Customs and Border Protection a list of contents and value, indicating the merchandise is a return back into the US and is thus duty-free | CUSTOMS DECLARATION   CN23 |
| Foreign Postal Administration logo | | |

FIG. 8

USPS RETURNS

Customer Self-Service

Generating a Returns Label is as Easy as 1-2-3.

Fill out a couple simple pieces of information, and you'll be on your way. We'll help you get your shipping label in minutes.

*Denotes a required field

Merchant Information  — Merchant Name: Tim's Toys — 810

Enter Your Address Information — 820
- *Customer Name: Some Body
- *Street Address: 901 D Street SW
- Apt / Suite / Other: 101
- *City: Washington
- *State: DC - District of Columbia
- ZIP:

Enter Package & Shipping Information — 830
- Merchandise Description: ← 840
- Please describe what you are returning, e.g. "Running Shoes"
- *Service Type: — 860
  - First Class™ Package Return Service
  - Ground Return Service
  - Parcel Return Service
  - Priority Mail® Return Service
- *Label Type: — 850

Next

FIG. 10A

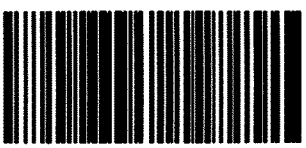

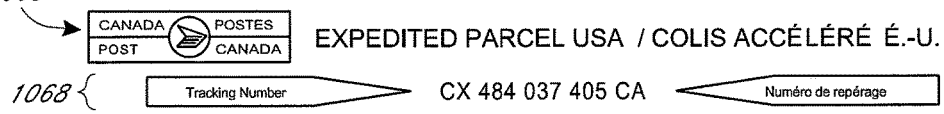

Instructions

1. Choose a box designed for shipping.
2. Wrap your items so that they are secure in the box and seal the box using proper shipping tape.
3. Cut the label on the dotted line and retain the bottom half for tracking purposes.
4. Tape the label so it appears squarely on the largest side of the box ( do not bend it around sides or end of box ). <u>Do not tape over any part of the barcode on the label.</u>
5. Take the parcel to a Canada Post retail outlet for shipping.

1. Choisissez une boite conçue pour l'expédition.
2. Empaquetez solidement vos articles dans la boîte et scellez le tout avec du ruban d'expédition.
3. Découpez l'étiquette le long du pointillé et conservez la partie inférieure pour suivi.
4. Apposez l'étiquette pour qu'elle paraisse entièrement sur le côté le plus grand de la boite (ne pas la replier sur les côtés). <u>Ne recouvrez aucune partie du code à barres de l'étiquette.</u>
5. Apportez le colis à un comptoir postal de Postes Canada pour expédition.

Merchant Instructions / Instructions du commerçant

This is sample text for the Merchant instructions field.

A barcode should be printed on the label because Delivery Confirmation is selected. If no bar code is visible, please contact the help desk at 1-800-277-4799 for assistance.
Un code a barres devrait être imprime sur l'étiquette lorsque la confirmation de livraison est choisie. Si le code a barres n'spparait pas. veuillez communiquer avec le service d'assistance au 1-800-277-4799.

Canada Border Services Agency / Agence des services frontaliers du Canada

CBSA INFORMAL ADJUSTMENT REQUEST
DEMANDE INFORMELLE DE RAJUSTEMENT DE L'ASFC

- PLEASE PRINT IN INK
- INSTRUCTIONS ON REVERSE
- VEUILLEZ IMPRIMER À L'ENCRE
- INSTRUCTIONS AU VERSO

NOTICE TO IMPORTERS • AVIS AUX IMPORTATEURS

This form is to be used when applying for refunds or adjustments on non-commercial importation.

Ce formulaire doit être utilisé quand vous faites une demande pour remboursements ou rajustements sur les importations non commerciales.

PART A — IMPORTER INFORMATION
PARTIE A — INFORMATION CONCERNANT L'IMPORTATEUR

1. Importer name and address - Nom et adresse de l'importateur
   - Name - Nom
   - No. - N°  Street - Rue  Unit No. - App.
   - City - Ville  Province  Postal Code - Code postal 2. Telephone number - Numéro de téléphone
   - Residence / Domicile ► ( )
   - Business / Bureau ► ( )

3. CBSA import receipt number (Please attach original import document)
   Numéro de reçu d'importation de l'ASFC (Veuillez joindre le document d'importation original)

Date of Importation / Date de l'importation ► Y-A  M  D-J

5. Description of goods - Description de la marchandise

6. Reason for refund/adjustment request
   Raison de la demande de remboursement ou de rajustement (a) ☐ Goods returned to sender/exported
         Marchandises retournées à l'expéditeur ou exportées (b) ☐ Incorrect value assessed              Value should be:
         Valeur évaluée incorrecte .............. Valeur devrait être: _____

(c) ☐ Goods incorrectly described or classified    Should be:
         Marchandises décrites ou classifiées incorrectement .... Devrait être: _____

(d) ☐ Other (specify)
         Autre (préciser): _____

7. Please provide a brief explanation of your request and attach the original import document. If the goods have been returned to the sender, attach documents to support your request, such as a credit note from the vendor or proof of export. If the goods were incorrectly classified, descriptive literature or an invoice from the vendor should be attached.

Veuillez fournir une brève explication de votre demande et joindre le document d'importation original. Si les marchandises ont été retournées à l'expéditeur, joindre tout autre document pour appuyer votre demande, telle une note de crédit du fournisseur ou une preuve d'exportation. Si les marchandises ont été mal classifiées, joindre la littérature descriptive ou une facture du fournisseur.

8. Declaration - Déclaration
   I declare the particulars of this document to be true, accurate and complete.    Je déclare que les renseignements sur ce document sont vrais, exacts et complets.

Signature                                          Date

PART B — CBSA USE ONLY    ◄— 1080
PARTIE B — À L'USAGE DE L'ASFC SEULEMENT

| 11. | 12. Adjustment No. - N° de rajustement |
|---|---|
| | 13. Request approved / Demande approuvée ► ☐ Yes/Oui ☐ No/Non | 14. Authority - Autorité |
| | 15. Authorizing officer - Agent autorisé | 16. Decision date / Date de la décision ► Y-A  M  D-J |

INSTRUCTIONS

PART A --- Importer Information

Field 1: Print your full name and address.

Field 2: Provide your telephone number(s) in order that the CBSA may contact you, if necessary, for further information.

Field 3: Provide the CBSA inventory/import receipt number from the CBSA Postal Import Form or the *Casual Goods Accounting Document* or from a courier receipt. You must attach the original Import document.

Field 4: Fill in the date of importation of the goods.

Field 5: Provide a description of the goods in question.

Field 6: Check the reason for requesting the refund/adjustment:

(a) If the goods were exported, attach proof of export (i.e. credit note from the vendor or bill of lading).

(b) If the value was incorrectly assessed, indicate the proper value and attach invoices from the vendor that show the correct value.

(c) For goods incorrectly described or classified, indicate the proper description of the goods and attach any descriptive literature of the goods. If known, indicate the proper classification number.

(d) If you are requesting a refund for another reason, please specify the reason (i.e. goods short-shipped, goods damaged prior to release from CBSA) and attach the invoices or other documents to support your claim.

Field 7: Provide a brief explanation of your request.

Field 8: Please sign and date the request form.

INSTRUCTIONS

PARTIE A --- Information concernant l'importateur

Zone 1: Inscrivez vos nom et adresse au complèt.

Zone 2: Indiquez vos numéros de téléphone afin que l'ASFC puisse communiquer avec vous pour de plus amples renseignements, s'il y a lieu.

Zone 3: Fournissez le numéro de reçu d'importation ou d'inventaire de l'ASFC a partir du *Formulaire des importations postales de l'ASFC*, de la *Déclaration en détail* des marchandises *occasionnelles* ou du récipissé du service de messagerie. Vous devez joindre le document d'importation original.

Zone 4: Indiquez la date d'importation des marchandises.

Zone 5: Fournissez une description des marchandises en question.

Zone 6: Cochez la raison de la demande de remboursement ou de rajustment :

(a) Si la marchandise a été exportée, fournissez une preuve d'exportation (p. ex. une note de crédit du fournisseur ou un connaissement).

(b) Si la valeur a été incorrectement évalués, indiquez la bonne valeur et joindre les factures du fournisseur indiquant la valeur réelie.

(c) Pour les marchandises incorrectement décrites ou classifiées, indiquez la bonne description et joignez tout document décrivant les marchandises. Si disponible, Indiquez le numéro de classement.

(d) Si vous demandez un remboursement pour une autre raison, précisez cette raison ( p. ex. marchandises manquantes, marchandises endommagées avant la mainlevée par l'ASFC), et joignez les factures ou autres documents à l'appui de votre demande.

Zone 7: Fournissez une brève explication concernant votre demande.

Zone 8: Veuillez signer et dater votre demande.

Mail this request to the CBSA Casual Refund Centre (addresses below) that coincides with the first letter of your postal code.
Veuillez envoyer votre demande de remboursement par la poste au Centre de remboursement pour les importations occasionnelles de l'ASFC (adresses ci-dessous) qui concorde avec la première lettre de votre code postal.

| A-B-C-E | G-H-J-K | L-M-N | P-R-S-T-X | V-Y |
|---|---|---|---|---|
| CBSA Casual Refund Centre Centre de remboursement pour les Importations occasionnelles de l'ASFC P.O. Box 430 YARMOUTH NS B5A 4B3 | Centre de remboursement pour les Importations occasionnelles de l'ASFC CBSA Casual Refund Centre 555 rue McArthur Street C.P. - P.O. Box 1454 Ville St-Laurent, QC H4T 1T4 | CBSA Casual Refund Centre Centre de remboursement pour les Importations occasionnelles de l'ASFC 7th floor - Suite 718, 55 Town Centre Court 55 court Centre-ville, 7° étege - bureau 718 SCARBOROUGH ON M1P 4X4 | CBSA Casual Refund Centre Centre de remboursement pour les Importations occasionnelles de l'ASFC Unit 14 Terminal 2, 101-2019 Sargent Ave. 101-2019 avenue Sargant, Unite 14 Terminal 2 WINNIPEG MB R3H 0Z7 | CBSA Casual Refund Centre Centre de remboursement pour les Importations occasionnelles de l'ASFC 685 rue Hamilton Street VANCOUVER BC V6B 2R4 |

SYSTEM AND METHOD FOR INTERNATIONAL MERCHANDISE RETURN SERVICE

CROSS-REFERENCE TO RELATED APPLICATION

This application is a continuation of U.S. patent application Ser. No. 13/787,668, filed on Mar. 6, 2013, now U.S. Pat. No. 8,918,341, and entitled "System and Method for International Merchandise Return Service", which is hereby incorporated by reference in its entirety.

BACKGROUND

Field of the Development

The application relates to a system and method for a merchandise return service. More particularly, the application relates to a merchandise return service operating across an international border.

Description of the Related Art

Merchants' require a cost-effective solution for returning merchandise to encourage buyer/consumer confidence, enhance customer satisfaction, and reduce package handling and delays while providing package visibility, such as via tracking and/or notifications. Electronic commerce retailers selling cross-border or consumers returning merchandise cross-border demand cost-effective and easy to use return solutions. According to the International Post Corporation's report entitled "Cross-Border Ecommerce," many electronic commerce retailers consider fulfilling orders to consumers outside of the United States to be too complicated, citing returns as a major hurdle (2011 International Post Corporation "Cross-Border Ecommerce Report," 2009).

As one example, Canada is the United States' single largest trading partner with over $249 billion in merchandise exports in 2010 (US Department of State: Canada Profile). Specific to ecommerce, 62% of Canadian consumers over the age of 18 have purchased a good or service cross-border from an online U.S. merchant (VISA: eCommerce Cross Border Handbook for US Retailers, 2010). U.S. merchants fulfill 81% (JC Williams. Group for VISA "2010 Online Shopping Study Summary: Canada eCommerce/Mobile/Cross Border") of the US $18 billion worth of total Canadian cross-border ecommerce purchases (Internet World Stats, World Bank database, online Apr. 11, 2012). For each purchase, there is a significant opportunity for a merchandise return. According to Fifty-One Global Checkout, a total of 7.9% of all merchandise purchased cross-border from U.S. merchants is returned (Fifty-One Global Checkout "Cross Border Returns," 2011). In light of these shortcomings, advances in handling international merchandise returns would be beneficial.

SUMMARY

In one embodiment, there is a method of generating a return label for merchandise being returned from a consumer in a first country to a merchant in a second country, the method comprising receiving merchant information including a merchant identifier; receiving identifying information of a user in a first country desiring to return merchandise; identifying a merchant account and a merchandise returns location in a second country based on the merchant information; obtaining, via a computing environment, information from a first country carrier for use in tracking the return merchandise; generating, via a computing environment, a first machine readable identifier for use by the first country carrier based at least on the information for use in tracking the return merchandise; generating, via a computing environment, a second machine readable identifier for use by a second country carrier based at least on information to route the return merchandise; and generating, via a computing environment, a return label for merchandise being returned from the user in the first country to the merchandise returns location in the second country, the return label including the first machine readable identifier, the second machine readable identifier and a customs declaration for the merchandise.

The method may additionally comprise identifying a carrier processing center in the second country that services the merchandise returns location. The return merchandise may be routed to the carrier processing center. The return label may further include a user name and address, merchant name and merchandise returns location address, and the carrier processing center address. The method may additionally comprise receiving a package at the processing center and computing an amount of a shipping charge due. The return label may further include an area for the amount of shipping charge due to be added by the processing center. The amount of shipping charge due may be deducted from an account for the merchant. The amount of shipping charge due may be charged to a credit card for the merchant. The return merchandise may be routed to the merchandise returns location. The customs declaration may indicate a return merchandise value of zero. The customs declaration may indicate no commercial value for the return merchandise. The customs declaration may indicate a return and one or more tariff codes indicative of returned merchandise. The first country may be Canada and the second country may be the United States. Alternatively, the first country may be the United States and the second country may be Canada. Receiving the identifying information of the user may include receiving a name and address of the user and a first country name. Receiving the merchant information may include receiving a second country name.

The method may additionally comprise electronically sending the generated return label to the user or configuring the return label for printing by the user. The method may additionally comprise generating a tracking code based at least on the information obtained from the first country carrier. The user may be a consumer of the merchandise. The first and second machine readable identifiers may be a barcode. The information obtained from the first country carrier may be in response to a real-time web service call. The computing environment may include a server associated with the second country carrier, a communications network in data communication with the server and a web application operating on the server. The computing environment may additionally comprise a server associated with the first country carrier, the server being in data communication with the communications network. The computing environment may additionally comprise a computing device associated with the user, the computing device being in at least intermittent data communication with the communications network.

In another embodiment, there is a method of processing a return label for merchandise being returned from a user in a first country to a merchant or seller of the merchandise in a second country, the method comprising receiving identifying information of a user in a first country desiring to return merchandise; receiving merchant information including a merchant identifier; identifying a merchant account and a merchandise returns location in a second country based on the received merchant information; receiving, in response to a web service call via a computing environment, information from a first country carrier for use in tracking the return merchandise; producing, via a computing environment, a tracking code based on the information obtained from the first country carrier; generating, via a computing environment, a first machine readable identifier for use by the first country carrier based at least on the tracking code; generating, via a computing environment, a second machine readable identifier for use by a second country carrier based at least on information to route the return merchandise; generating, via a computing environment, a return label for merchandise being returned from the user in the first country to the merchandise returns location in the second country, the return label including the first machine readable identifier, the second machine readable identifier and a customs declaration for the merchandise; receiving a package with the return label affixed thereupon at a carrier processing center in the second country that services the merchandise returns location; computing an amount of shipping charges due for the received package; deducting the shipping charges due from an account for the merchant or charging a credit card for the merchant; and reimbursing the first country carrier for service rendered by the first country carrier.

Receiving the identifying information of the user may include receiving a name and address of the user and a first country name. The first and second machine readable identifiers may be a barcode.

In another embodiment, there is a method of processing a return label for merchandise being returned from a user in a first country to a merchant or seller of the merchandise in a second country, the method comprising receiving identifying information of a user in a first country desiring to return merchandise; receiving merchant information including a merchant identifier; identifying a merchant account and a merchandise returns location in a second country based on the received merchant information; receiving, in response to a web service call via a computing environment, information from third-party shared database for use in tracking the return merchandise; producing, via a computing environment, a tracking code based on the information obtained from the third-party shared database; generating, via a computing environment, a first machine readable identifier for use by a first country carrier based at least on the tracking code; generating, via a computing environment, a second machine readable identifier for use by a second country carrier based at least on information to route the return merchandise; generating, via a computing environment, a return label for merchandise being returned from the user in the first country to the merchandise returns location in the second country, the return label including the first machine readable identifier, the second machine readable identifier and a customs declaration for the merchandise; receiving a package with the return label affixed thereupon at a carrier processing center in the second country that services the merchandise returns location; computing an amount of shipping charges due for the received package; deducting the shipping charges due from an account for the merchant or charging a credit card for the merchant; and reimbursing the first country carrier for service rendered by the first country carrier.

In another embodiment, there is a method of generating a return label for merchandise being returned from a user in a first country to a merchant or seller of the merchandise in a second country, the method comprising receiving merchant information including a merchant identifier; receiving identifying information of a user in a first country desiring to return merchandise; identifying an address for a merchandise returns location in a second country based on the merchant information; generating, via a computing environment, a first machine readable identifier for use by a first country carrier based at least on the user information; generating, via a computing environment, a second machine readable identifier for use by a second country carrier based at least on information to route the return merchandise; and generating, via a computing environment, a return label for merchandise being returned from the user in the first country to the merchandise returns location in the second country, the return label including the first machine readable identifier, the second machine readable identifier and a customs declaration for the merchandise.

Receiving the identifying information of the user may include receiving a name and address of the user and a first country name. The first and second machine readable identifiers may be a barcode. The first machine readable identifier may be additionally based on information obtained from the first country carrier in response to a real-time web service call via the computing environment.

In another embodiment, there is a computer-readable storage medium storing one or more sequences of instructions which, when executed by one or more processors, causes the one or more processors to perform a method comprising receiving merchant information including a merchant identifier; receiving identifying information of a user in a first country desiring to return merchandise; identifying an address for a merchandise returns location in a second country based on the merchant information; generating a first machine readable identifier for use by a first country carrier based at least on the user information; generating a second machine readable identifier for use by a second country carrier based at least on information to route the return merchandise; and generating a return label for merchandise being returned from the consumer in the first country to the merchandise returns location in the second country, the return label including the first machine readable identifier, the second machine readable identifier and a customs declaration for the merchandise.

Receiving the identifying information of the user may include receiving a name and address of the user and a first country name. The first and second machine readable identifiers may be a barcode. The first machine readable identifier may be additionally based on information obtained from the first country carrier in response to a real-time web service call via a computing environment. The first machine readable identifier may be additionally based on information obtained from a third-party shared database via a computing environment.

In another embodiment, there is a method of generating a return label for merchandise being returned from a user in a first country to a merchant or seller of the merchandise in a second country, the method comprising receiving merchant information including a merchant identifier; receiving identifying information of a user in a first country desiring to return merchandise; accessing an address for a merchandise returns location in a second country based on the merchant information; generating, via a computing environment, a machine readable identifier for use in tracking delivery based at least on the user information; and generating, via a computing environment, a return label for merchandise being returned from the user in the first country to the merchandise returns location in the second country, the return label including the machine readable identifier and a customs declaration for the merchandise.

Receiving the identifying information of the user may include receiving a name and address of the user and a first country name. The machine readable identifier may be a barcode. The machine readable identifier may be additionally based on information obtained from a first country carrier in response to a real-time web service call via the computing environment. The machine readable identifier may be additionally based on information obtained from a third-party shared database via the computing environment.

In another embodiment, there is a method of processing a return label for merchandise being returned from a user in a first country to a merchant or seller of the merchandise in a second country, the method comprising providing an origination shipping label for merchandise being shipped from a merchant or seller of the merchandise in a second country to a user in a first country; receiving identifying information of the user in the first country desiring to return merchandise; receiving merchant information including a merchant identifier; identifying a merchant account and a merchandise returns location in the second country based on the received merchant information; receiving, via a computing environment, information from a first country carrier for use in tracking the return merchandise; producing, via a computing environment, a tracking code based on the information obtained from the first country carrier; generating, via a computing environment, a first machine readable identifier for use by the first country carrier based at least on the tracking code; generating, via a computing environment, a second machine readable identifier for use by a second country carrier based at least on information to route the return merchandise; generating, via a computing environment, a return label for merchandise being returned from the user in the first country to the merchandise returns location in the second country, the return label including the first machine readable identifier, the second machine readable identifier and a customs declaration for the merchandise; receiving a package with the return label affixed thereupon at a carrier processing center in the second country that services the merchandise returns location; computing an amount of return shipping charges due for the received package; determining if the second country carrier is the same carrier for both an origination shipment of the merchandise and the merchandise return; deducting the return shipping charges due from the account for the merchant or charging a credit card for the merchant if the second country carrier is not the same carrier for both the origination shipment of the merchandise and the merchandise return shipment; and reimbursing the first country carrier for service rendered by the first country carrier.

The merchant may not be charged for the return shipping charges if the second country carrier is the same carrier for both the origination shipment of the merchandise and the merchandise return shipment. The merchant may be charged an amount for the return shipping charges that is less than the regular rate for a particular class of shipping service if the second country carrier is the same carrier for both the origination shipment of the merchandise and the merchandise return shipment. The merchant may be charged a flat rate amount for the return shipping charges that is less than the regular rate for a particular class of shipping service if the second country carrier is the same carrier for both the origination shipment of the merchandise and the merchandise return shipment, and the user initiates a return of the merchandise. The customs declaration may include a tariff code indicative of returned merchandise and an item description of the merchandise.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope; the disclosure will be described with the additional specificity and detail through use of the accompanying drawings.

FIG. 5A is a diagram of an example unfilled returns label such as that utilized in the embodiments described in FIG. 2, 3 or 4.

FIG. 5B is a table of example label elements that can be used to generate an international merchandise return label, such as the example label of FIG. 5A.

FIG. 8 is an example screen display for entry of merchant, consumer and/or shipping information such as used in the embodiments described in FIG. 2, 3 or 4.

FIG. 10A is a diagram of another example of a filled-in returns label such as utilized in the embodiments described in FIG. 2, 3 or 4;

FIG. 10B is a diagram of an associated example customs form such as utilized with the example returns label shown in FIG. 10A;

FIG. 10C is a diagram of an associated example customs form instructions sheet such as utilized with the example customs form shown in FIG. 10B.

DETAILED DESCRIPTION OF CERTAIN EMBODIMENTS

Figure 1A:
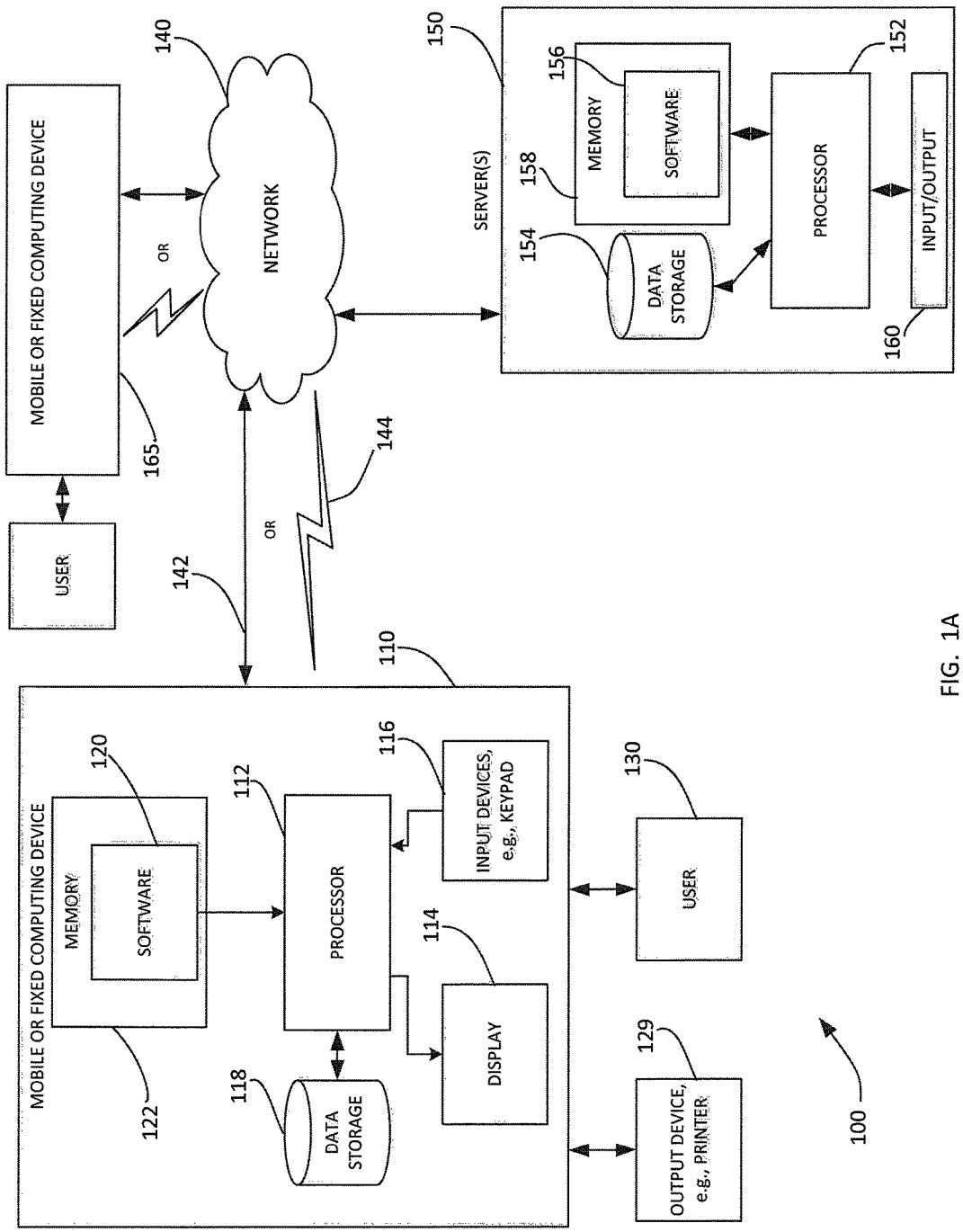
FIG. 1A is a block diagram of one embodiment of a configuration for operating a system and method for processing a return label for merchandise being transferred between two countries.

The following detailed description of certain embodiments presents various descriptions of specific embodiments of the development. However, the development can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the developments herein described.

The system and method described herein can be implemented on various configurations of hardware and software. The system can be comprised of various modules, tools, and applications as discussed below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of a preferred system. Thus, the processes that are undergone by each of the modules may be arbitrarily redistributed to one of the other modules, combined together in a single module, or made available in, for example, a shareable dynamic link library. Depending on the embodiment, certain modules may be removed, merged together, or rearranged in order. Also depending on the embodiment, certain steps of the methods may be added, rearranged, combined, or removed.

The system modules, tools, and applications may be written in any programming language such as, for example, C, C++, C#, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, C#, BASIC, Visual Basic, Pascal, Ada, Java, HTML, XML and FORTRAN are industry standard programming languages for which many commercial compilers can be used to create executable code.

Definitions

The following provides a number of useful possible definitions of terms used in describing certain embodiments of the disclosed development.

A network may refer to a network or combination of networks spanning any geographical area, such as a local area network (LAN), wide area network (WAN), regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others. In addition, connectivity to the network may be, for example, via remote modem, Ethernet (IEEE 802.3), Token Ring (IEEE 802.5), Fiber Distributed Datalink Interface (FDDI) or Asynchronous Transfer Mode (ATM). As used herein, the network includes network variations such as the public Internet, a private network within the Internet, a secure network within the Internet, a private network, a public network, a value-added network, an intranet, and the like.

A website may refer to one or more interrelated web page files and other files and programs on one or more web servers. The files and programs are accessible over a computer network, such as the Internet, by sending a hypertext transfer protocol (HTTP or HTTPS [S-HTTP]) request specifying a uniform resource locator (URL) that identifies the location of one of the web page files, where the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may include that which is presented by a standard web browser in response to an HTTP request specifying the URL by which the web page file is identified. A web page can include, for example, text, images, sound, video, and animation.

A computer or computing device may be any processor controlled device. The computer or computing device may be a device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants (PDAs), interactive or web-enabled wireless communications devices, mobile web browsers such as operating on a smartphone, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, UNIX, any of the versions of Microsoft Windows, Apple MacOS, IBM OS/2 or other operating system. The appropriate operating system may include a communications protocol implementation that handles all incoming and outgoing message traffic passed over the network. In other embodiments, while the operating system may differ depending on the type of computer, the operating system will continue to provide the appropriate communications protocols to establish communication links with the network.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to a website. In one instance, the website includes program logic, which enables the website to communicate with the externally implemented components, modules, and databases to perform the functions such as disclosed herein.

Example Computing Environments

Figure 1B:
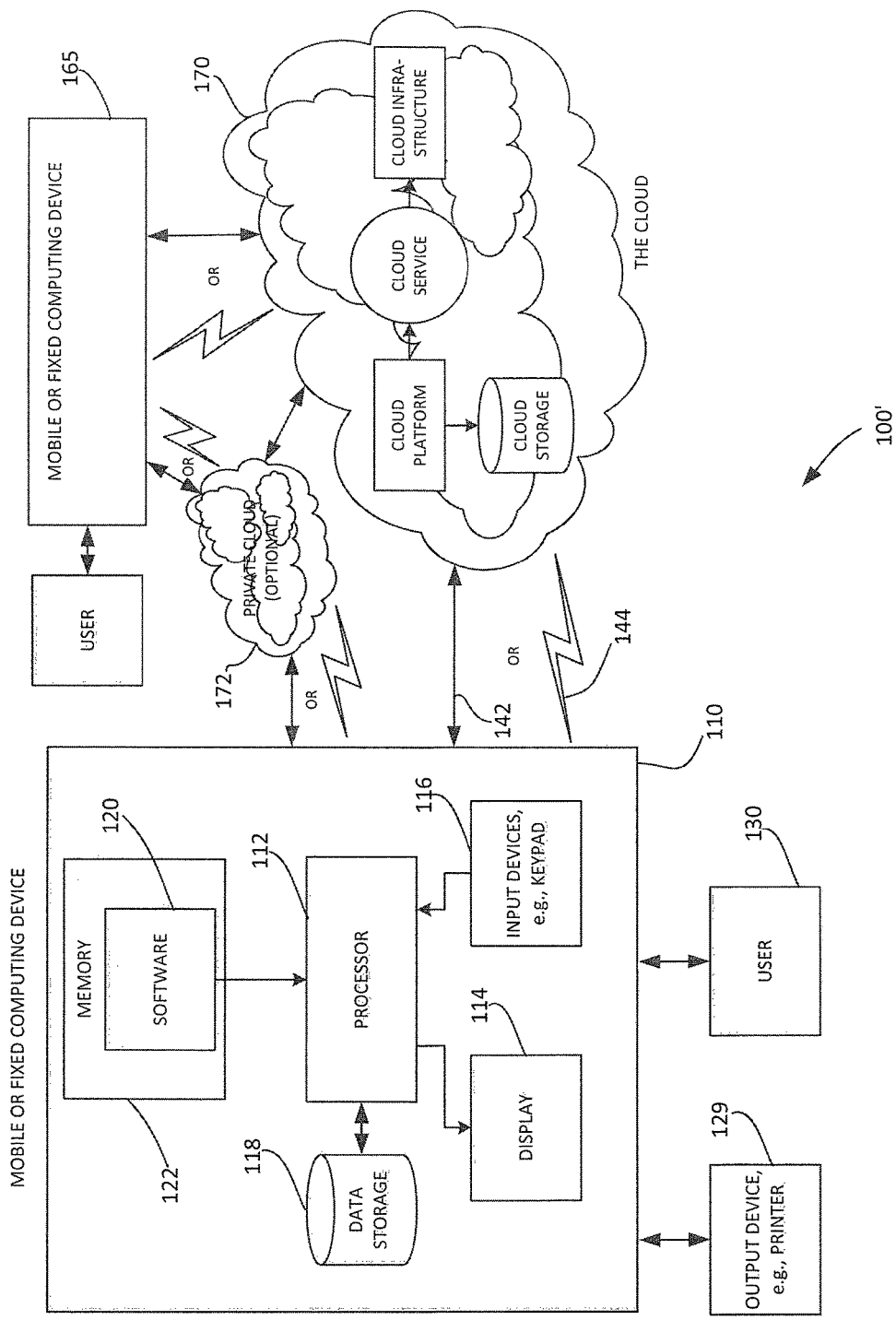
FIG. 1B is a block diagram of another embodiment of a configuration for operating a system and method for processing a return label for merchandise being transferred between two countries.

Certain embodiments of a system utilize a network as described in conjunction with FIG. 1A, or utilize a cloud, as described in conjunction with FIG. 1B. Certain embodiments are based on an example open system integrated architecture such as shown in FIG. 1A and FIG. 1B. In FIGS. 1A and 1B, the example open system integrated architecture may be based on, for example, a user interface interacting with a local or remote data repository and a local or remote application running on a local or remote application server, such as an application server 150. FIGS. 1A and 1B are block diagrams of an example system 100 that may be used to implement certain systems and methods described herein. The functionality provided for in the components and modules of computing system 100 may be combined into fewer components and modules or further separated into additional components and modules. Various other types of electronic devices communicating in a networked environment may also be used.

Referring to FIG. 1A, an example configuration of components of an embodiment of the system 100 will now be described. A mobile or fixed computing device 110 is operated by a user 130. There may be other mobile or fixed computing devices such as a device 165 operated by other users. The computing device 110 can be a handheld computing device or other portable computing device such as a Palm, Pocket personal computer (PC), Linux based handheld, PDA, smartphone such as an iPhone® or Android™ based phone, a tablet computer such as an iPad® or Android based tablet, or a PC having a display. In other embodiments, the computing device can be any form of a network or Internet connected device, including but not limited to PCs, mobile devices, PDA, laptops, tablets, chips, keyboards, voice audio and video software, mouse, keypads, touch pads, track ball, microphones, videos, storage devices, network devices, databases, scanners, copiers, digital pens, image recognition software and device, screens and other forms of displays, netbooks and other forms of computer hardware. The computing device 110 in certain embodiments can operate in a stand-alone (independent) manner. In other embodiments, the computing device 110 is in communication with one or more servers 150 via a network 140, such as a local area network, a wide area network, or the Internet. The server(s) can include one or processors 152, memory 158, data storage 154 and system software 156 executed by the processor(s), and input or output devices 160. In certain embodiments, the data storage 154 stores one or more databases used by the system. The processor(s) 152 are in communication with the database(s) via a database interface, such as structured query language (SQL) or open database connectivity (ODBC). In certain embodiments, the data storage 154 is not included in server(s) 150, but is in data communication with the server(s) via the database interface. The connection from the computing device 110 to the network 140 can be a wireless or a satellite connection 144 or a wired or direct connection 142. In certain embodiments, the server(s) are part of a web site, such as a site on an intranet or the Internet.

When the computing device 110 is connected with the server(s) 150, the web site may optionally provide updates on new features. In another embodiment, the computing device runs software for the system and method described herein only when connected to the server(s) 150.

The computing device 110 can include a processor 112, memory 122, a display 114, and one or more input devices 116. The processor 112 can be in data communication with a data storage 118. In certain embodiments, the data storage 118 may store prior records of the user and/or other data or software. System software 120 can be executed by the processor 112. The system software 120 may include an application graphical user interface (GUI). The application GUI can include a database interface to the data storage 118 of the computing device. In certain embodiments, the software is loaded from the data storage 118. In embodiments where the computing device 110 communicates with a web site, the processor utilizes browser software in place of or in addition to the software 120. The network browser may be, for example, Microsoft Internet Explorer®, Apple Safari®, Mozilla Firefox®, Google Chrome™, browsers from Opera Software™, and so forth. An output device 129, such as a printer is connected to the computing device 110.

Referring to FIG. 1B, an example configuration of components of an embodiment of a system 100' using a cloud computing architecture will now be described. The configuration of components in FIG. 1B is similar to that of FIG. 1A except that the network 140 and servers 150 of FIG. 1A are replace by the cloud 170 of FIG. 1B. An optional private cloud 172 can also be utilized. Cloud computing can include web-based tools or applications that users can access and use through a web browser as if it were a program installed locally on their own computer. In certain embodiments, the cloud 170 can comprise various computers, servers and data storage devices that function to provide a cloud platform (e.g., a web front end), cloud service (e.g., a queue), cloud infrastructure, and cloud storage (e.g., a database). A public/external cloud can be used with a private cloud in a hybrid cloud or a combined cloud environment in certain embodiments.

Figure 1C:
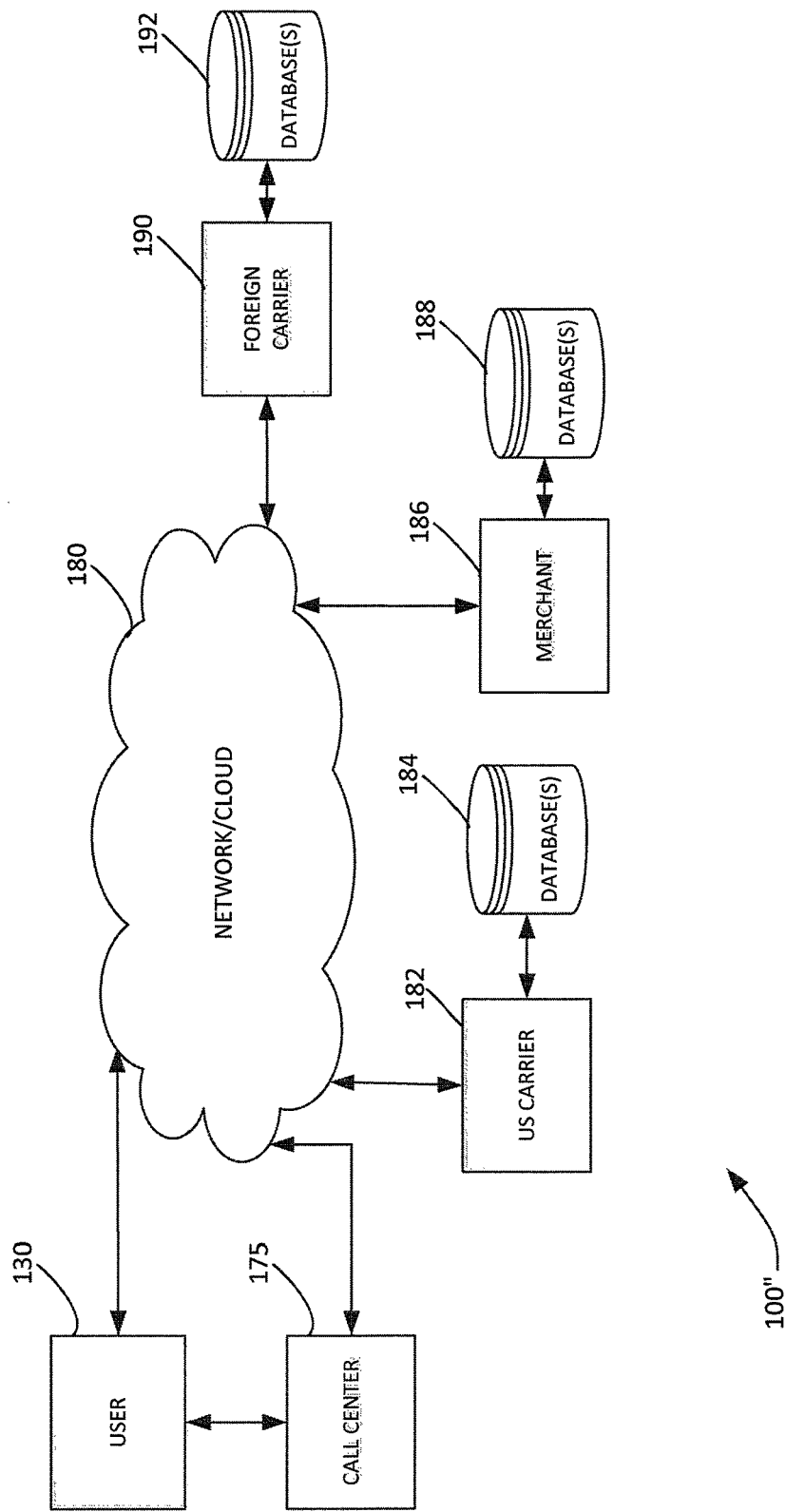
FIG. 1C is a block diagram of another embodiment of a configuration for operating a system and method for processing a return label for merchandise being transferred between two countries.

Referring to FIG. 1C, an example configuration of components of an embodiment of a system 100" using a network or a cloud computing architecture will now be described. The components in FIG. 1C are similar to that of FIGS. 1A and 1B. The user or buyer of merchandise 130 experiences a similar performance of a carrier returns application or program whether the application is performed through a network or the cloud. Alternatively, the user 130 can call a call center 175 for the merchant where a call center agent fields the call and opens a returns web application or program. The returns application or program can be performed at a U.S. carrier website 182 or at a merchant website 186 where an application programming interface (API) can integrate the returns application with the merchant website. The U.S. carrier website 182 and the merchant website 186 are in communication with a network or cloud 180 via predefined protocols. A foreign carrier website 190 is also in data communication with the network or cloud 180.

The U.S. carrier website 182 is in data communication with one or more databases 184. The databases 184 can include, but are not limited to, service type and rate information, tariff codes corresponding to merchandise and to returns, buyer information (e.g., address), postage due facility information, tracking information, billing information, customs information and locations and merchant information, such as merchant name and type, merchant return location(s), account ID, service preferences, customer registration ID, mailer ID, permit number, and so forth.

The merchant website 186 is in data communication with one or more databases 188. The databases 188 can include, but are not limited to, merchandise/product information, return merchandise authorization (RMA) information, returns locations, service type and rate information, tariff codes, buyer information (e.g., address), postage due facility information, customs information and locations, and so forth. In certain embodiments, other merchants (not shown) can communicate with the network or cloud 180.

The foreign carrier website 190 is in data communication with one or more databases 192. The databases 192 can include, but are not limited to, service type and rate information, tariff codes, buyer information (e.g., address), merchant information, tracking information, customs information and locations, and so forth. In certain embodiments, other foreign carriers (not shown) can communicate with the network or cloud 180.

Figure 1D:
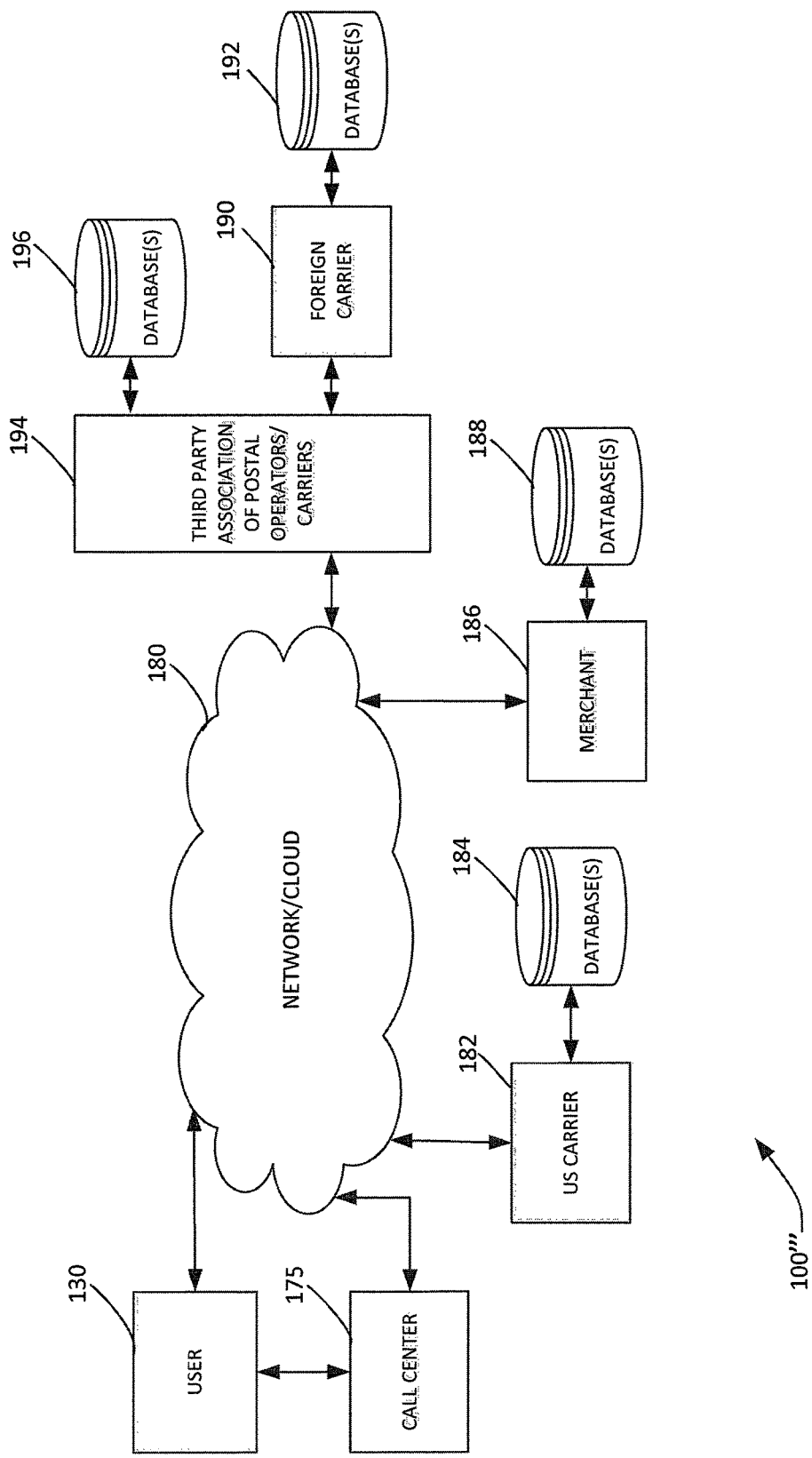
FIG. 1D is a block diagram of yet another embodiment of a configuration for operating a system and method for processing a return label for merchandise being transferred between two countries.

Referring to FIG. 1D, an example configuration of components of an embodiment of a system 100''' using a network or a cloud computing architecture will now be described. The components in FIG. 1D are similar to that of FIG. 1C. However, one or more third-party shared databases are added. A third-party association of postal operators or carriers website 194 can communicate with the network or cloud 180 and be further in communication with the foreign carrier 190. The third-party association website 194 can be in data communication with one or more databases 196. The databases 196 can include, but are not limited to, service type and rate information, tariff codes, buyer information (e.g., address), merchant information, tracking information, billing information, customs information and locations, and so forth. In certain embodiments, other foreign carriers (not shown) can communicate with and utilize the third-party association website 194.

Operation

Consumers of merchandise ordered online (or via telephone or mail) expect that if a merchandise return needs to be done, that the return can be done easily. Certain embodiments described below explain an easy to perform return process, e.g., without paying for a return shipping/mailing charge or postage, without going to a carrier office and/or without weighing the merchandise.

The system and method described herein is applicable for use with two or more different countries, where a purchaser or consumer located in one country orders merchandise from a merchant of the merchandise located in another country. In other embodiments, the merchandise may be purchased from an entity that is not a merchant, such as a private party, for example. For the example processes described herein, the merchant is described as being in the United States, although the process is also applicable if the merchant is in another country.

Figure 2:
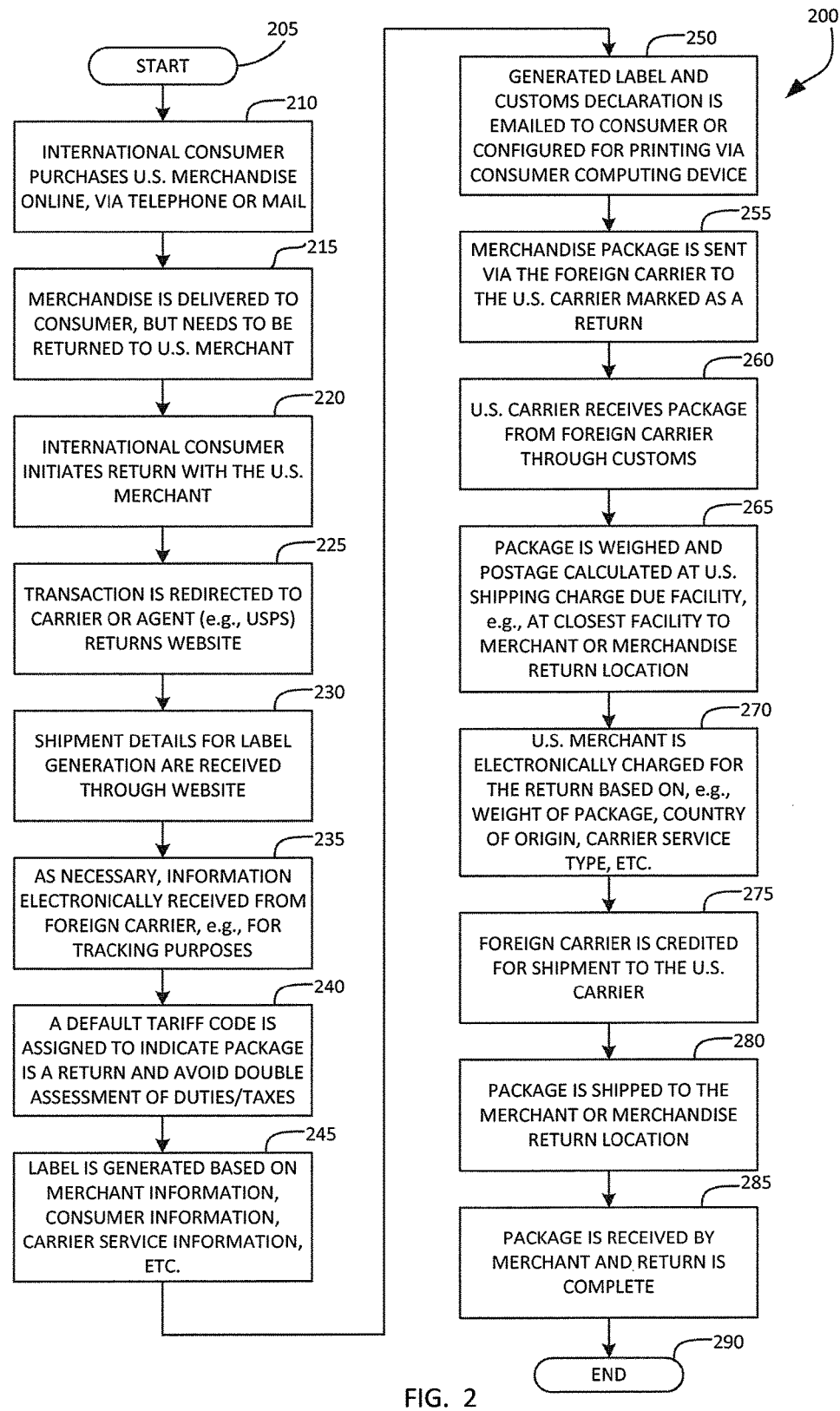
FIG. 2 is a flow diagram of one embodiment of a method for processing merchandise returns using a system such as that shown in FIG. 1A, 1B, 1C or 1D.

Referring to FIG. 2, an example top-level international merchandise returns process 200 or module will be described. In process 200, a return label is generated when the purchaser decides to return the merchandise. Computer implemented steps of the process may be performed on the system 100 shown in FIG. 1A, system 100' shown in FIG. 1B, system 100" shown in FIG. 1C or system 100''' shown in FIG. 1D. Depending on the embodiment, certain steps of the process may be added, rearranged, combined, or removed.

Beginning at a start state 205, process 200 continues at state 210 where a consumer in a first country purchases merchandise from a U.S. merchant via the Internet, world wide web, or other online means, although the purchase can be performed via the telephone, mail, or other means. In certain embodiments, the merchant registers with a merchandise handling agent or carrier by providing information so that information such as a merchant name, merchant account, merchant type and service preferences can be obtained. In other embodiments, the merchant can register with an organization such as the United States Postal Service® (USPS). Information such as a customer registration identification (CRID), a mailer identification (MID) and a permit number can be generated for association with the merchant. In certain embodiments, the merchant can be assigned a different MID for each country from which returns are to be accepted. In certain embodiments, each mailing facility or depot associated with a particular merchant can be assigned a different CRID. In other embodiments and/or for other countries, other information may be obtained and/or generated. For example, the merchant or seller of the merchandise may not need a permit number, a CRID, a MID and/or other particular identifiers.

Proceeding to a state 215, the purchased merchandise is delivered to the consumer in the first country, but the consumer desires to return at least some of the received merchandise. In certain embodiments, an agent or carrier such as the USPS transports the merchandise from the merchant, such as from a merchant depot or shipping location, to a mailing service of the first country for delivery to the location of the consumer.

Advancing to state 220, the consumer initiates a return of the merchandise to the merchant, such as by accessing a returns portion of a website for the merchant. Alternatively, the consumer calls a call center for the merchant where a call center agent fields the call and opens a returns web application or program. In other embodiments, other ways to initiate a return are envisioned. In certain embodiments, a return merchandise authorization (RMA) can be assigned for the return by the merchant website or the call center agent.

In certain embodiments, the carrier in the second country is used for both the outbound and inbound shipments. In this situation, the carrier can offer merchants who ship outbound using certain mail service types, such as priority mail international or express mail international for example, a low flat rate for international returns. In other embodiments, other service levels can be utilized. The flat rate international return label can be generated, on demand when a customer requests to return an item, by accessing the original outbound order to create the new flat rate return, therefore ensuring an outbound/inbound linkage. This service offering may incentivize merchants to grow their outbound volume by decreasing the barriers of international shipping. In certain embodiments, the flat rate return is only paid for if a return is initiated by a customer requesting from the merchant to return an item. This service will appeal to certain merchants based on the value of the merchandise, the volume of transactions, and their customer base.

Moving to state 225, in either situation (website or call center) described at state 220, the returns transaction is redirected to the agent's returns website where a returns application is performed. In certain embodiments, the agent's returns application is performed as a cloud application. In other embodiments, the website for the merchant can instead utilize an application programming interface (API) to integrate the returns application with the merchant website.

Figure 7:
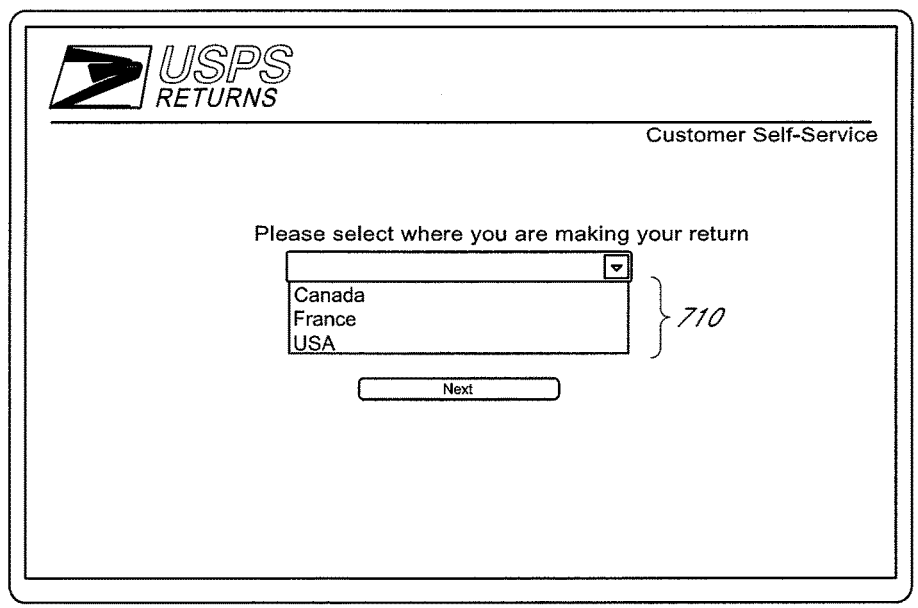
FIG. 7 is an example screen display for selection of a consumer's country such as used in the embodiments described in FIG. 2, 3 or 4.

Continuing at a state 230, process 200 receives shipment details for generating a return label through the website application. For example, the country from which the consumer is returning the merchandise can be identified via an example interface display screen 700 such as shown in FIG. 7 where a list of countries 710 is displayed for selection. In other embodiments, the country can be obtained in other ways, Referring to FIG. 8, a further example interface display screen 800 can be used to identify merchant information 810, such as the merchant name. The merchant name can be used to access merchant information from the data storage 154 (FIG. 1A) or the cloud storage in cloud 170 (FIG. 1B), for example. The merchant information can include information such as the address of the merchant depot closest to the consumer, for example, if the merchant has more than one depot for returns. In embodiments where the merchandise is purchased from a party other than a merchant, an address for receiving the return is accessed. If the website application is accessed by a call center agent, the merchant information 810 may be prepopulated with the corresponding merchant information.

Figure 9:
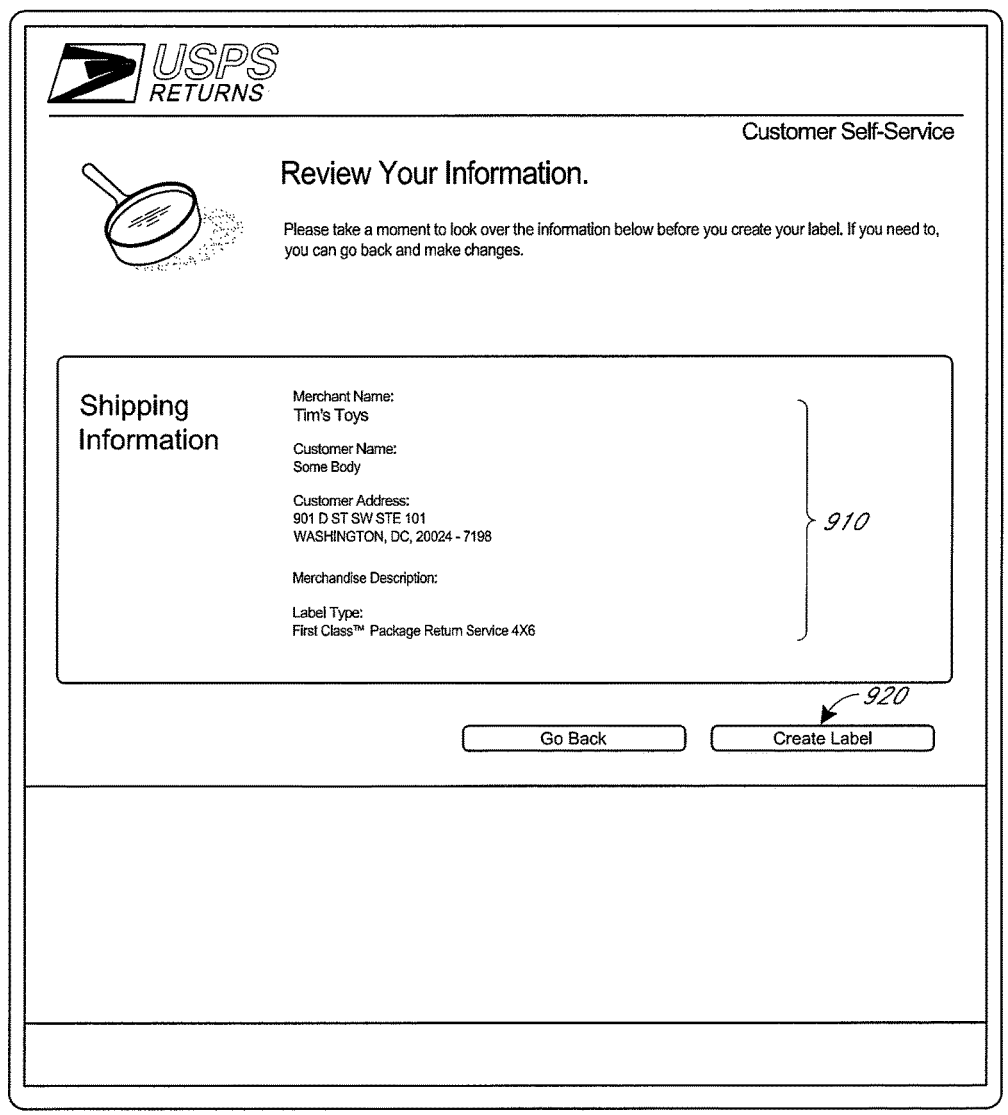
FIG. 9 is an example screen display for review of merchant, consumer and/or shipping information such as used in the embodiments described in FIG. 2, 3 or 4.

The display screen 800 can additionally display entry fields in a name and address section 820 for receiving the name and address of the consumer returning the merchandise. The display screen 800 can additionally display entry fields in a package and shipping information section 830 for receiving a description of the merchandise being returned 840, a selection of a service type 850, and a selection of a label type 860. In certain embodiments, the service type 850 can be selected from a list of service types including First Class™ Package Return Service, Ground Return Service, Parcel Return Service, and Priority Mail® Return Service. In other embodiments, the selections can include First Class Mail International (FCMI) parcels, Priority Mail International (PMI) parcels, and/or Express Mail International (EMI) parcels. In certain embodiments, the label type 860 can be selected from a list of labels types including, but limited to, 4"×4", 4"×6", 5"×8", A4 and A5 label sizes. In other embodiments, any size that is agreed to by the carriers of both countries can be used. After the process 200 receives the entered information, an example interface display screen 900, such as shown in FIG. 9, displays the received information 910 for confirmation. If the information is correct, a button 920 can be selected or clicked to proceed with creating the return label.

Proceeding to state 235, process 200 optionally initiates a real-time web service call to the carrier service of the first country (from which the merchandise is being returned) to obtain a unique identifier for the return label. In other embodiments, other electronic ways to obtain information needed for the return label, such as to track the returns package, are utilized. In certain embodiments, the unique identifier can be utilized as a unique tracking number. In certain embodiments, the carrier service of the first country provides an entire machine-readable identifier such as a barcode. In other embodiments, the carrier service of the first country provides a pre-established range of identifier characters to be used by the return application in generating the machine-readable identifier. Furthermore, in certain embodiments address standardization and/or verification are performed on the consumer's address. However, in other embodiments, address standardization and/or verification of the consumer's address is not required. In yet other embodiments, the real-time web service call or other electronic request is made to the third-party shared database corresponding to the third-party association described above instead of to the first country carrier.

Figure 6:
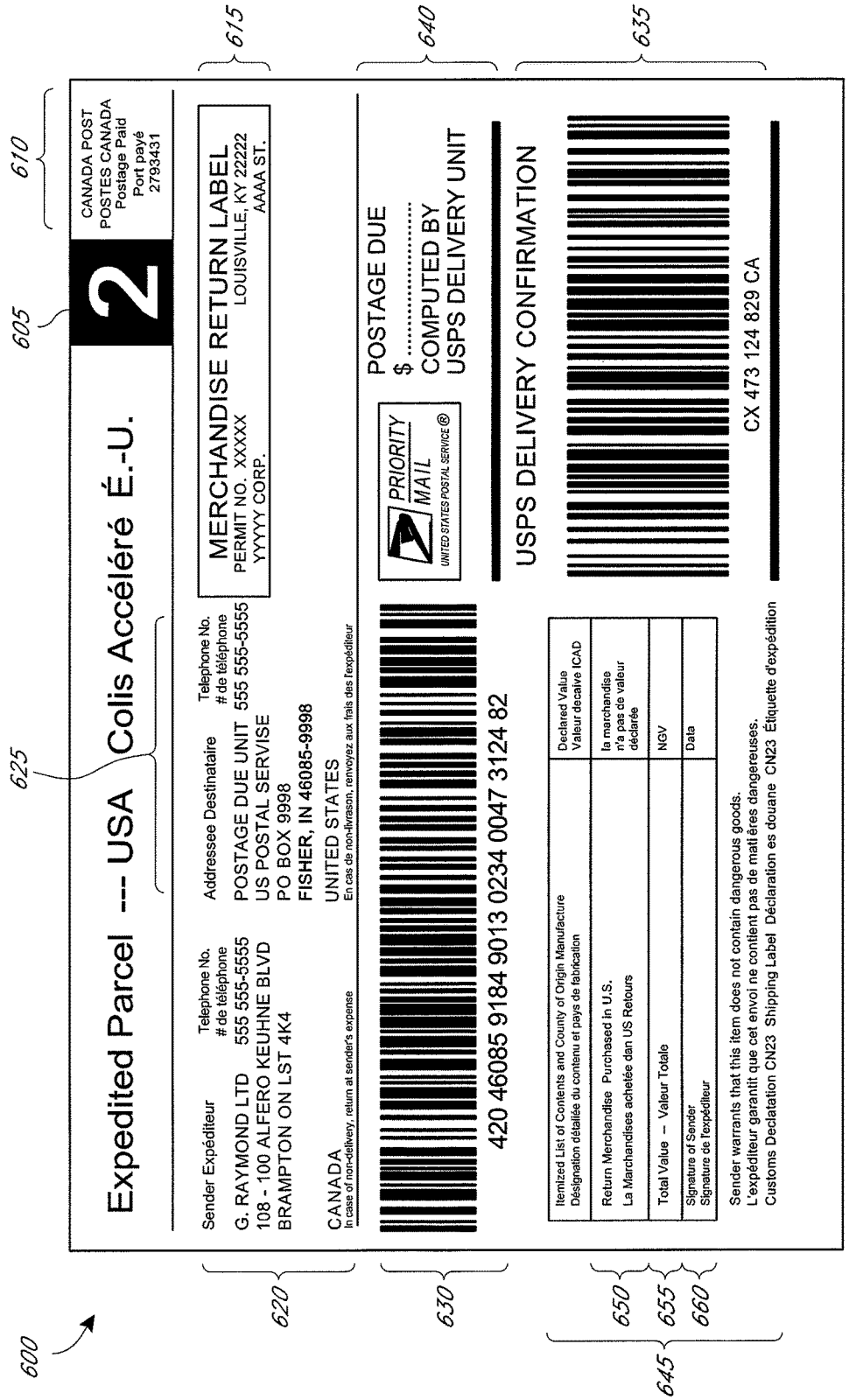
FIG. 6 is a diagram of an example filled-in returns label such as that utilized in the embodiments described in FIG. 2, 3 or 4.

Advancing to state 240, process 200 assigns a default tariff code to indicate that the package is return merchandise so as to avoid double assessment of duties and/or taxes. For instance, a customs declaration CN23 can be a portion of the return label as illustrated in FIGS. 5 and 6, where the itemized list of contents can indicate "Return Merchandise" and the value of the contents can be "$0". In other embodiments, the itemized list of contents can indicate "Return Merchandise Purchased in U.S." (or other country where the merchandise was purchased) and the declared value of the contents can be "No commercial value".

Moving to state 245, process 200 generates a completed return label 600, an example of which is illustrated in FIG. 6, based on the merchant information, consumer information, carrier service information from one or both countries, and so forth. In certain embodiments, the return label includes a machine readable identifier such as a S10 international barcode used for delivery confirmation and/or a carrier package barcode, such as a USPS intelligent mail package barcode (IMpB) for efficient routing, a designated area for a carrier shipping charge due facility to calculate and mark the appropriate postage amount, a carrier logo or insignia indicative of the service type, and a customs form prepopulated with text to clearly indicate a return.

Continuing at state 250, the generated return label and customs declaration is either emailed to the consumer for later printing, or is configured for immediate printing on a printer. In other embodiments, another party, such as the call center, can print the generated return label and mail it to the consumer. After the return label is printed, the consumer affixes the label on the merchandise package. In certain embodiments, the consumer retains a portion of the label that can have a tracking number for tracking purposes. The consumer sends the package at state 255 through the carrier service of the first country to a carrier service of the second country. In certain embodiments, the postal service of the first country picks up the package at the location of the consumer. In other embodiments, the consumer drops off the package at designated locations, such as a retail outlet, of the carrier service. The return label has a special indicator that marks the item as a return, and therefore, the carrier service of the first country accepts the package without charging the consumer for any shipping charges or postage.

Advancing to state 260, the postal service of the first country delivers the package to a customs service location of the country receiving the package, such as a U.S. Customs and Border Protection location. In certain embodiments, the customs service location is based on one or both of the locations of the consumer and a carrier shipping charge due facility identified on the return label. Based on the information on the customs declaration portion of the return label, the customs service can pass the package directly on to the carrier service of the second country without inspection or assessing any fees. In other embodiments, customs could access a database having information from the label such as when the label is electronically generated.

Moving to state 265, the package is forwarded to the carrier shipping charge due facility identified on the return label where the package is weighed and shipping charges are calculated. In certain embodiments, the shipping charges are based on the weight of the package, the country of origin and the carrier service type or class of mail. In certain embodiments, the carrier shipping charge due facility can be the USPS postage due unit. In certain embodiments, the shipping charge due facility is the closest unit to the merchant returns depot or other location for receiving the return. In certain embodiments, the shipping charges due are added to the return label. In other embodiments, other ways of determining the shipping charge due are envisioned, which may include not sending the package to a facility to determine the shipping charge due.

Proceeding to state 270, the shipping charge due is deducted from the merchant account or alternatively, the shipping charge due is charged to a credit card for the merchant. In certain embodiments, merchant information is not encoded in a bar code. However, in other embodiments, certain merchant information can be encoded to facilitate payment of the shipping charge. At state 275, the carrier service that delivered the package to the customs service is credited for the shipment of the package. Continuing to state 280, the package is then delivered to the merchant depot, where it is received by the merchant at state 285 and the return is complete. Process 200 ends at state 290.

In other embodiments, the first country where the consumer is located can be the United States, and the country where the merchant is located is another country, such as Canada. In such a scenario, a carrier service ships the package from the U.S. consumer to the Canada Border Services Agency, which then provides the package to a carrier service or agent, such as Canada Post, for delivery to the Canadian merchant. The process can be utilized with other countries as well.

Figure 3:
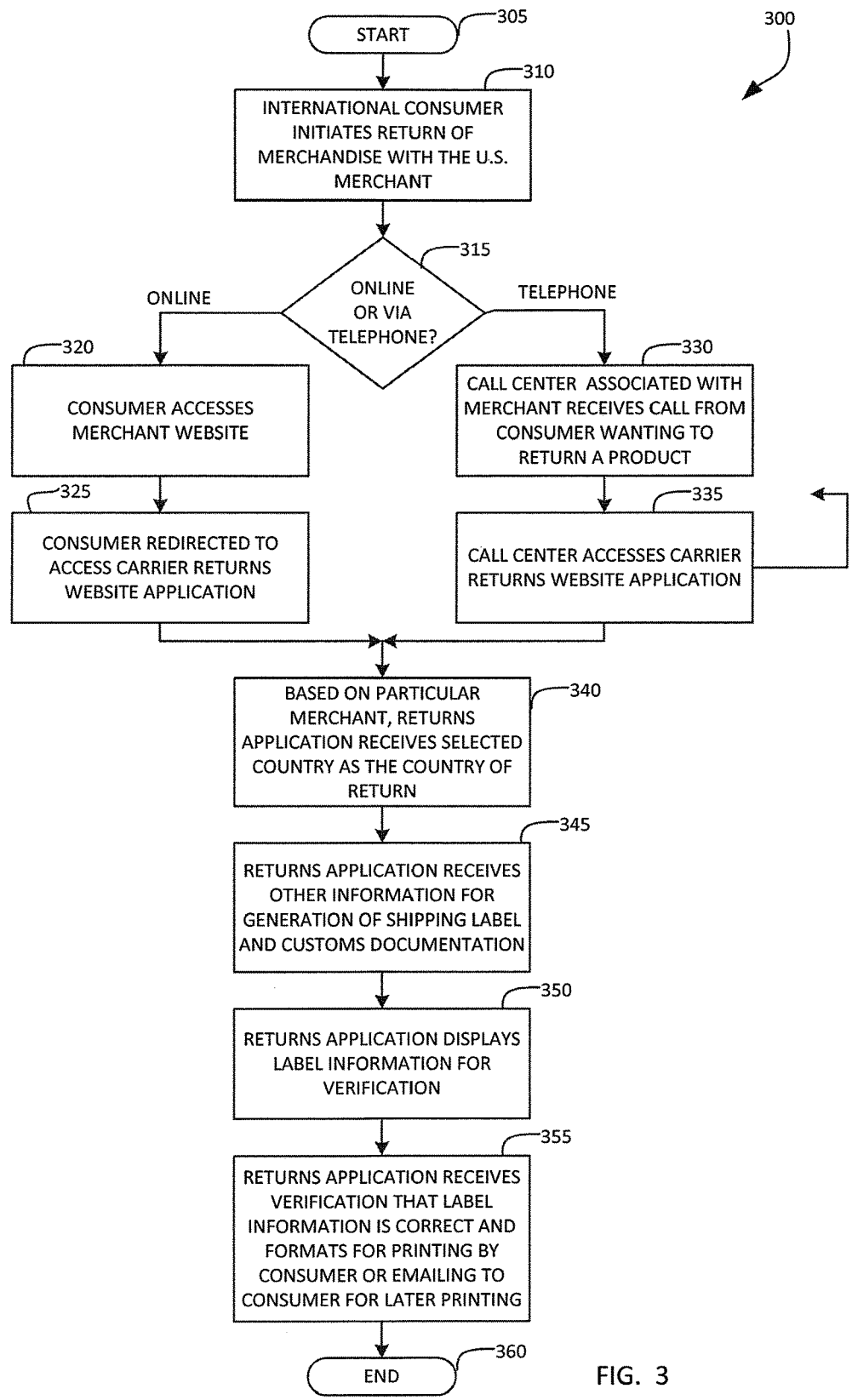
FIG. 3 is a flow diagram of one embodiment of a method for initiating merchandise returns using a system such as that shown in FIG. 1A, 1B, 1C or 1D.

Referring to FIG. 3, an example process 300 or module for initiating merchandise returns will be described. Process 300 illustrates steps for initiating a return, obtaining information and generating the return label in an alternative way than described above in conjunction with FIG. 2. Computer implemented steps of the process may be performed on the system 100 shown in FIG. 1A, system 100' shown in FIG. 1B, system 100" shown in FIG. 1C or system 100''' shown in FIG. 1D. Depending on the embodiment, certain steps of the process may be added, rearranged, combined, or removed.

Beginning at a start state 305, process 300 continues at state 310 where a consumer in a first country initiates a return of the merchandise to the merchant or seller of the merchandise. This can be done by ways such as by accessing a returns portion of a website for the merchant or by calling a call center for the merchant where a call center agent fields the call. Moving to a decision state 315, process 300 determines how the return is being initiated. If the return is initiated online, process 300 proceeds to state 320 where the consumer accesses a merchant website. In certain embodiments, a return merchandise authorization (RMA) can be assigned for the return by the merchant website. Advancing to a state 325, the consumer is redirected to access a carrier or agent returns website application. However, if the return was initiated via a telephone call, process 300 moves to state 330 where the call center associated with the merchant receives the call from the consumer wanting to return merchandise to the merchant. In certain embodiments, a RMA can be assigned for the return by the call center agent. Proceeding to state 335, the call center agent is directed to access a carrier or agent returns website where a returns application is performed. In certain embodiments, the returns application is performed as a cloud application. In other embodiments, the website for the merchant can instead utilize an API to integrate the returns application with the merchant website. In certain embodiments, the returns application is a USPS returns application.

Continuing at a state 340, process 300 receives shipment details for generating a return label through the website application. The application user selects the country where the package is being returned. Specifically, the country from which the consumer is returning the merchandise can be identified via the example interface display screen 700, such as shown in FIG. 7 where a list of countries 710 is displayed for selection. In other embodiments, the country from which the consumer is returning the merchandise can be predetermined or can be obtained in other ways.

Proceeding to state 345, the returns application receives other information for the shipping label and customs documentation. Referring to FIG. 8, an example interface display screen 800 can be used to identify merchant information 810, such as the merchant name. The merchant name can be used to access merchant information from the data storage 154 (FIG. 1A) or the cloud storage in cloud 170 (FIG. 1B), for example. The merchant name can be used to access merchant information, such as the address of the merchant depot closest to the consumer, for example, if the merchant has more than one depot for returns. In embodiments where the merchandise is purchased from a party other than a merchant, an address for receiving the return is accessed. If the website application is accessed by a call center agent, the merchant information 810 may be prepopulated with the corresponding merchant information. The display screen 800 can additionally display entry fields in a name and address section 820 for receiving the name and address of the consumer returning the merchandise. The display screen 800 can additionally display entry fields in a package and shipping information section 830 for receiving a description of the merchandise being returned 840, a selection of a service type 850, and a selection of a label type 860.

Continuing at a state 350, the returns application displays the received information for verification by the consumer directly or via the call center agent. Moving to state 355, the returns application receives verification that the label information is correct, generates the return label, and formats the generated label for printing by the consumer or for emailing to the consumer for later printing. Process 300 completes at end state 360.

Figure 4:
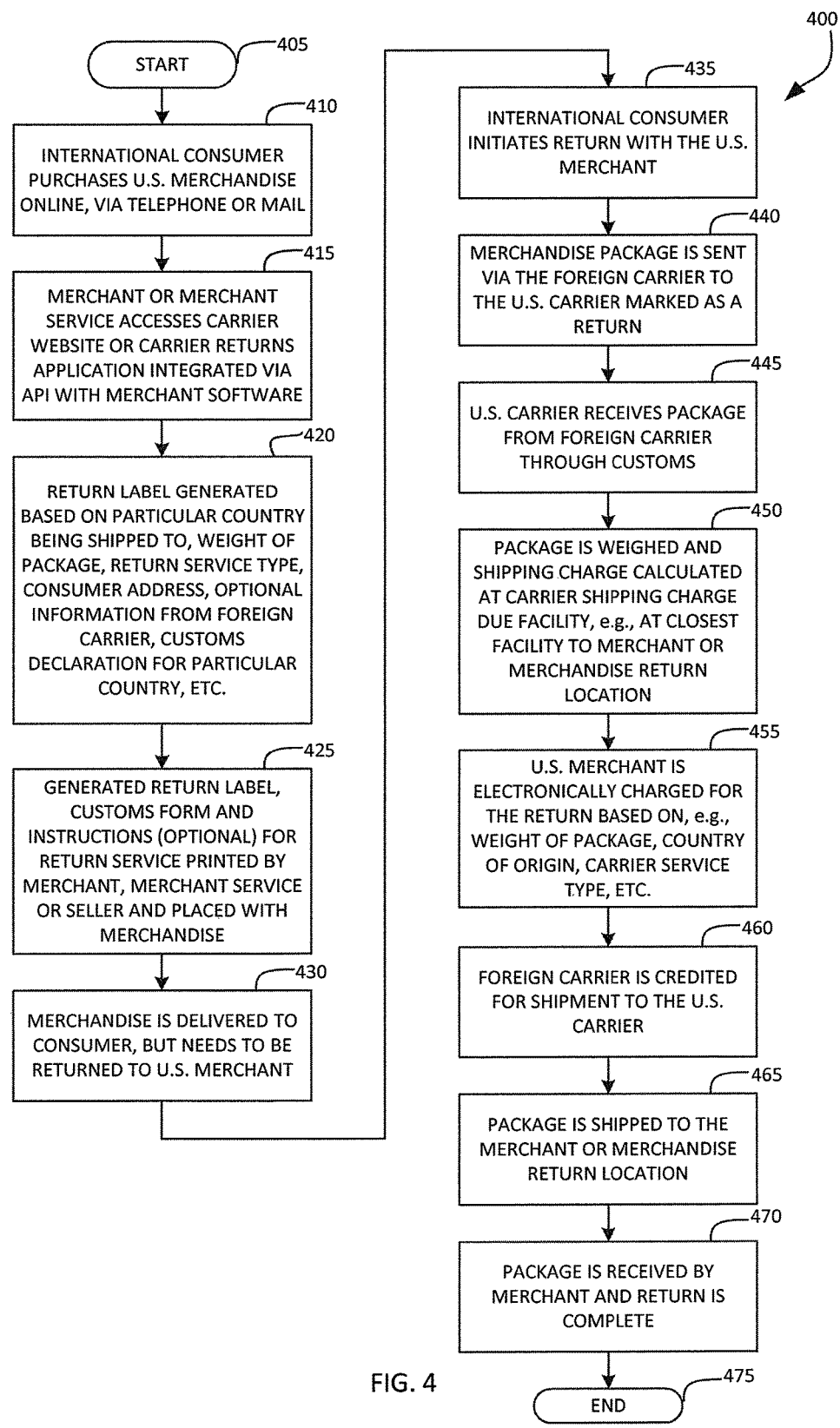
FIG. 4 is a flow diagram of another embodiment of a method for processing merchandise returns using a system such as that shown in FIG. 1A, 1B, 1C or 1D.

Referring to FIG. 4, an example top-level international merchandise returns process 400 or module will be described. In process 400, a return label is generated by the merchant or seller of the merchandise and included with the merchandise when shipped to the purchaser. Computer implemented steps of the process may be performed on the system 100 shown in FIG. 1A, system 100' shown in FIG. 1B, system 100" shown in FIG. 1C or system 100'" shown in FIG. 1D. Depending on the embodiment, certain steps of the process may be added, rearranged, combined, or removed. Process 400 implements generation and printing of the return label by the merchant in one country when the merchandise is being shipped to a consumer in another country.

Beginning at a start state 405, process 400 continues at state 410 where a consumer in a first country purchases merchandise from a U.S. merchant or other seller of merchandise via the Internet, world wide web, or other online means, although the purchase can be performed via the telephone, mail, or other means. In other embodiments, the merchant or seller is in a country other than the United States.

Advancing to state 415, the merchant or a service for the merchant accesses a carrier or agent website for a returns application, or alternatively, accesses a carrier returns application integrated via an API with the merchant's software. In certain embodiments, the returns application is a USPS returns application.

Proceeding to state 420, the returns application generates a return label based on the merchant information (such as described in conjunction with FIG. 2), a particular country the merchandise is being shipped to, weight of package, return service type, e.g., mail class, consumer name and address, e.g., including country of origin, optional information from the carrier service of the particular country, customs declaration information, and so forth. In certain embodiments, the customs form is blank at this time. In other embodiments, the customs declaration can be pre-populated in one of at least several possible ways: 1) pre-populate the customs declaration with the exception of the contents section, where the item description needs to be hand written by the shipper for accuracy, 2) pre-populate the customs declaration including the contents section with generic wording such as "returned merchandise" with a value of 0 (zero), or 3) if the origination shipment contains only one item, pre-populate the entire customs declaration based on that item. Process 400 can optionally initiate a real-time web service call to the carrier service of the particular country, such as their postal service, to obtain a unique identifier for the return label, or other information to be used for the return label. In other embodiments, other electronic ways to obtain information needed for the return label, such as to track the returns package, are utilized. In certain embodiments, the unique identifier can be utilized as a unique tracking number. In yet other embodiments, the real-time web service call or other electronic request is made to the third-party shared database corresponding to the third-party association described above instead of to the carrier of the particular country.

Proceeding to state 425, the return label generated by the returns application, a customs form, which may be part of the label or a separate document, and optional instructions for the consumer to utilize the return service are printed by the merchant or the service for the merchant and placed in a package with the merchandise to be shipped to the consumer.

Moving to a state 430, the purchased merchandise is delivered to the consumer in the first country, but the consumer desires to return at least some of the received merchandise. In certain embodiments, a carrier transports the merchandise from the merchant, such as from a merchant depot or shipping location, to a carrier service of the first country for delivery to the location of the consumer.

Advancing to state 435, the consumer initiates a return of the merchandise to the merchant. In certain embodiments, this can be done by placing the returns label received with the merchandise on a package for returning the merchandise, which can be the received package if it is not damaged, for example. In other embodiments, the consumer may need to access a returns portion of a website for the merchant or call a call center for the merchant where a call center agent fields the call and opens a returns web application. The customs declaration portion can be completed via the returns application as described above. In other embodiments, certain information, e.g., one or more item descriptions, may be added to the customs portion via handwriting. In certain embodiments, a return merchandise authorization (RMA) may be needed for the return which can be assigned by the merchant website or the call center agent. In certain embodiments, the consumer retains a portion of the return label that may have a tracking number for tracking purposes.

Continuing at state 440, the consumer sends the package via the carrier service of the first country. In certain embodiments, the carrier service of the first country picks up the package at the location of the consumer or the consumer drops off the package at designated locations, such as a retail outlet, of the carrier service. The return label can have a special indicator that marks the item as a return, and therefore, the carrier service of the first country can accept the package without charging the consumer for any shipping fee or postage.

Advancing at state 445, the carrier service of the first country delivers the package to a customs service location of the country receiving the package, such as a U.S. Customs and Border Protection location. In certain embodiments, the customs service location is based on one or both of the locations of the consumer and a carrier shipping charge due facility identified on the return label. Based on the information on the customs declaration portion of the return label, the customs service can pass the package directly on to the carrier of the country receiving the package without inspection or assessing any fees.

Moving to state 450, the package is forwarded from the customs location to the carrier shipping charge due facility, e.g., postage due unit, identified on the return label where the package is weighed and postage calculated. In certain embodiments, the shipping charges are based on the weight of the package, the country of origin and the carrier service type or class of mail. The weight of the package that was sent to the consumer was known when the return label was generated, but the weight is checked here to confirm that the package weighs the same as when it was first shipped to the consumer, for example, if a partial return is made. In certain embodiments, the shipping charge due facility is the closest unit to the merchant or merchant returns depot. In certain embodiments, the shipping charge due amount is added to the return label. In other embodiments, other ways of determining the shipping charge due are envisioned.

Proceeding to state 455, the shipping charge due is deducted from the merchant account or alternatively, the postage due is charged to a credit card for the merchant. At state 460, the carrier service of the first country that delivered the package to the customs service is credited for the shipment of the package. Continuing to state 465, the package is then delivered to the merchant, merchant depot or seller of the merchandise, where it is received by the merchant at state 470 and the return is complete. Process 400 ends at state 475.

In other embodiments, the first country where the consumer is located can be the United States, and the country where the merchant is located is another country, such as Canada. In such a scenario, a carrier or agent, such as the USPS, ships the returns package from the U.S. consumer to the Canada Border Services Agency, which then provides the package to a carrier or agent, such as Canada Post, for delivery to the Canadian merchant. The process can be utilized with other countries as well.

Referring to FIG. 5A, an example unfilled merchandise return label 500 is illustrated. The example label 500 is for a return of merchandise purchased from a merchant in the United States by a consumer in Canada. This example return shipment utilizes a Canadian carrier, such as the Canada Post, and a U.S. carrier, such as the USPS using Priority Mail.

Referring to FIG. 5B, a table 505 of label elements that can be used to generate an international merchandise return label, such as example label 500 (FIG. 5A), is illustrated. Column 510 of table 505 describes each of the individual label elements. Column 515 of table 505 describes the significance of the individual label elements, and column 520 illustrates an example of each of the individual label elements.

Row 530 of table 505 indicates utilization of one or more tracking barcodes, with or without utilization of delivery scanning indicators, such as "railroad tracks", USPS DELIVERY CONFIRMATION®, or USPS TRACKING™ if the USPS is the U.S. carrier. These elements enable end-to-end tracking, from acceptance in the foreign country by the foreign carrier to delivery by the U.S. carrier. The railroad tracks and the verbiage over the barcode are scanning indicators for carrier handlers. Certain barcodes may or may not include routing information, e.g., for routing the package to the delivery carrier's 5-digit ZIP code. Example bar codes are shown in column 520.

Row 535 of table 505 indicates utilization of a merchandise return label with carrier permit holder information for the particular merchant. In certain embodiments, the element can be used to ensure the postage amount for the returned merchandise is deducted from the correct permit account holder's account. An example merchandise return label portion with a permit number, merchant name and address is shown in column 520.

Row 540 of table 505 indicates utilization of the carrier's logo, design and/or trademarks to indicate the service level used for the returned merchandise. An example design and trademarks are shown in column 520.

Row 545 of table 505 indicates utilization of the carrier's logo, design and/or trademarks along with a postage due area. This identifies the service level used for the returned merchandise and allows carrier personnel to add the calculated postage due on the package prior to delivery and deduction from the permit holder's account. An example design, trademarks and the postage due area are shown in column 520.

Row 550 of table 505 indicates utilization of a "to" address that can indicate either a U.S. address, such as for a merchant returns location, or a carrier postage due facility address. An example postage due address is shown in column 520. Row 555 indicates utilization of a foreign "from" address, and an example foreign address is shown in column 520.

Row 560 of table 505 indicates utilization of a section dedicated to customs, which may or may not reflect known customs form CN 23. This section provides customs, such as U.S. Customs and Border Protection, a list of contents and corresponding value, indicating the merchandise is a return back into the U.S., and is therefore duty-free. An example customs declaration is shown in column 520.

Referring to FIG. 6, an example filled-in (completed) merchandise return label 600 is illustrated. The example label 600 is for a return of merchandise purchased from a merchant in the United States by a consumer in Canada. The indicia or feature "2" in a block at area 605 is a numerical representation of the destination office of exchange (OE). This example return shipment utilizes a Canadian carrier, such as the Canada Post, and indicates Canadian postage paid in area 610. A box area 615 has the insignia "MERCHANDISE RETURN LABEL" and includes a Permit No. for the merchant along with a name of the merchant and an address of a merchant or a merchant depot. A name, address and telephone number of the Canadian consumer in this example are illustrated in area 620. A carrier shipping charge due facility is identified by an address and telephone number in area 625. In certain embodiments, a machine-readable identifier such as an IMpB barcode indicative of routing information is illustrated at area 630, and a machine-readable identifier such as a S10 international barcode used for delivery confirmation is illustrated in area 635. In other embodiments other codes or means can be utilized. In yet other embodiments, the delivery confirmation feature may not be utilized.

In certain embodiments, the example barcode in area 630 can be indicative of the merchant returns location or of the shipping charge due facility address. In certain embodiments, the example barcode in area 635 includes a two letters at the beginning that are the item prefix where the first letter can be used to designate the mail class, e.g., C for parcels, E for express mail service (EMS), and L for letters. The second letter in the prefix may not be strictly defined between posts or carriers in most cases; rather it serves as an internal differentiator. There can be exceptions where the inter-postal exchange may rely upon the second letter (e.g., if the USPS designates CU and EU for returns, for example). The last two letters can be the country code suffix (e.g., CA is an item that originated in Canada, US is an item that originated in the US, etc.). The nine numbers in between can be used for uniqueness. Carriers can assign certain prefix-number range combinations to certain customers or channels if they desire. For example, the USPS assigns prefix-number range combinations to certain customers and channels.

A designated area 640 for a carrier shipping charge due facility, such as a USPS postage due unit, to calculate and mark the appropriate postage amount also includes a carrier logo or insignia indicative of the return service type. A customs form, such as a customs declaration CN23, is illustrated in area 645. The customs declaration is prepopulated with text such as "Return Merchandise" in the itemized list of contents and a value of "$0" to clearly indicate a return at area 650. A total value can be indicated at area 655, and a signature of sender block and date block are provided at area 660. In other embodiments and/or for other countries, other forms and/or fields can be used.

Referring to FIGS. 10A, 10B and 10C, another example of a filled-in (completed) merchandise return label 1000, an associated example customs form 1070 and an associated customs form instructions sheet 1090 are illustrated. The example label 1000 and customs form 1070 are for a return of merchandise purchased and imported from a merchant in the United States by a consumer in Canada. Return label 1000 is similar to the return label 600 previously described above. However, rather than the machine-readable identifier shown in area 630 in FIG. 6, return label 1000 includes an area 1031 where the date that the label is completed is provided along with the gross weight of the returned merchandise. In yet other embodiments, other information can be provided in area 1031. In certain embodiments, a detachable area 1065 provides instructions for the consumer to prepare the merchandise return package and label. A tracking number area 1068 provides the consumer a copy of the tracking number to be retained. The detachable area 1065 is separated from the upper label portion 1000 prior to the label being affixed to the package. For this example return to the United States from Canada, a Canadian Border Services Agency (CBSA) Informal Adjustment Request form 1070 (FIG. 10B) is illustrated. A part A 1075 is for information about the consumer, the merchandise, the reason for the return and a declaration, and a Part B 1080 is for official use by the CBSA. Instructions for the consumer for aid in completing Part A are provided on the instructions sheet 1090 (FIG. 10C). In other embodiments, a similar form can be used for returns to Canada from the United States, and between other counties as well.

Figure 11A:
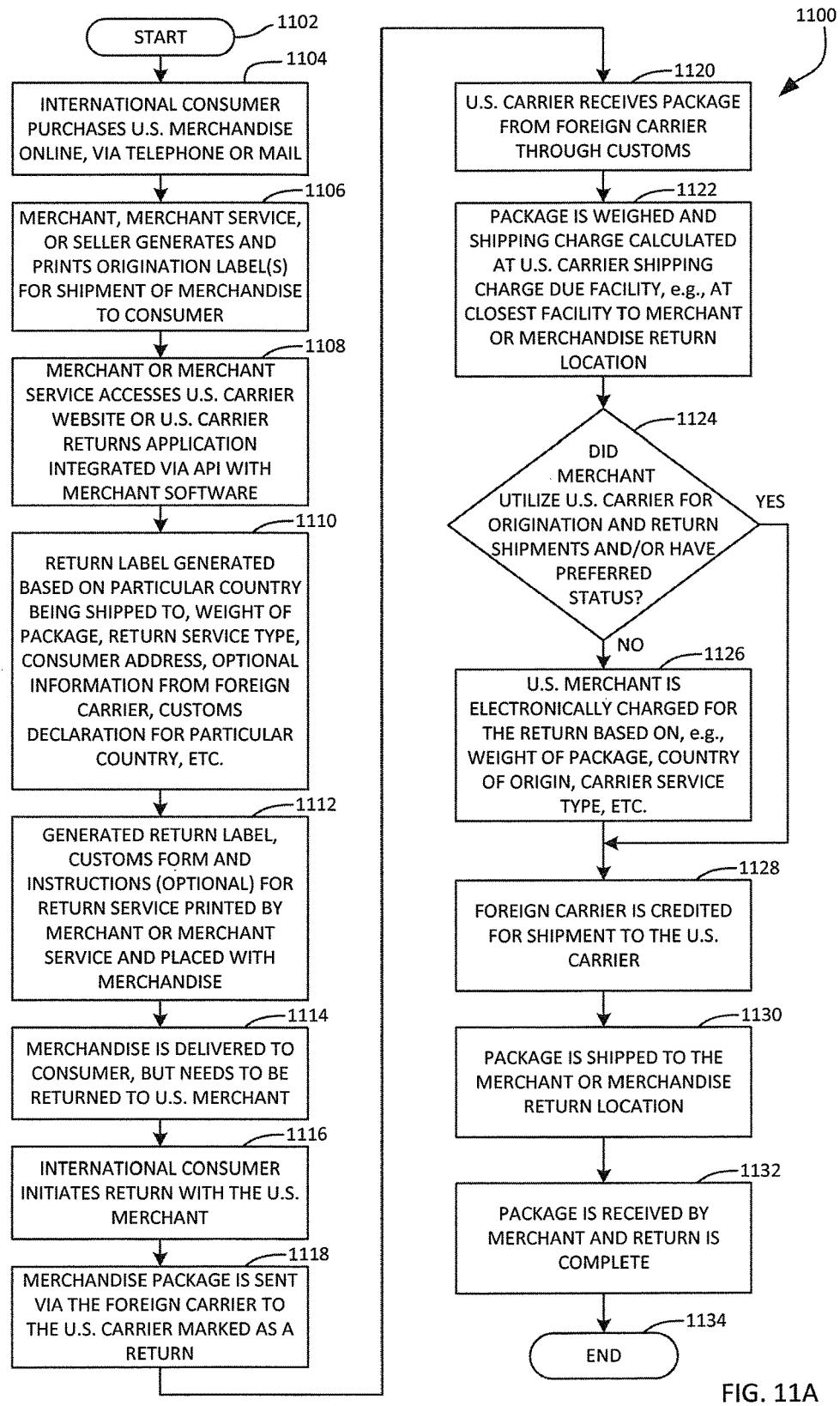
FIG. 11A is a flow diagram of another embodiment of a method for processing merchandise returns using a system such as that shown in FIG. 1A, 1B, 1C or 1D.

Referring to FIG. 11A, an example top-level international merchandise returns process 1100 or module for use with an online auction and shopping website or other vendor that can establish a preferred relationship with a carrier will be described. In other embodiments, process 1100 can be used when the merchant utilizes the carrier for both outbound and inbound (returns) shipments. However, process 1100 can be utilized if the outbound carrier is different than the return carrier or if a preferred relationship with the carrier has not yet been established. In process 1100, an outbound shipping label and a return label are generated by the merchant or seller of the merchandise and included with the merchandise when shipped to the purchaser. Computer implemented steps of the process may be performed on the system 100 shown in FIG. 1A, system 100' shown in FIG. 1B, system 100" shown in FIG. 1C or system 100''' shown in FIG. 1D. Depending on the embodiment, certain steps of the process may be added, rearranged, combined, or removed. Process 1100 implements generation and printing of the return label by the merchant in one country when the merchandise is being shipped to a consumer in another country.

Beginning at a start state 1102, process 1100 continues at state 1104 where a consumer in a first country purchases merchandise from a U.S. merchant or other seller of merchandise via the Internet, world wide web, or other online means, although the purchase can be performed via the telephone, mail, or other means. In other embodiments, the merchant or seller is in a country other than the United States.

Proceeding to state 1106, the merchant, merchant service or seller generates or otherwise prepares and prints origination label(s) for shipment of the merchandise to the consumer or buyer.

Advancing to state 1108, the merchant or a service for the merchant accesses a carrier or agent website for a returns application, or alternatively, accesses a carrier returns application integrated via an API with the merchant's software. In certain embodiments, the returns application is a USPS returns application.

Proceeding to state 1110, the returns application generates a return label based on the merchant information (such as described in conjunction with FIG. 2), a particular country the merchandise is being shipped to, weight of package, return service type, e.g., mail class, consumer name and address, e.g., including country of origin, optional information from the carrier service of the particular foreign country, customs declaration information, and so forth. In certain embodiments, the customs form is blank at this time. In other embodiments, the customs declaration can be pre-populated in one of at least several possible ways: 1) pre-populate the customs declaration with the exception of the contents section, where the item description needs to be hand written by the shipper for accuracy, 2) pre-populate the customs declaration including the contents section with generic wording such as "returned merchandise" with a value of 0 (zero), or 3) if the origination shipment contains only one item, pre-populate the entire customs declaration based on that item. Process 1100 can optionally initiate a real-time web service call to the carrier service of the particular country, such as their postal service, to obtain a unique identifier for the return label, or other information to be used for the return label. In other embodiments, other electronic ways to obtain information needed for the return label, such as to track the returns package, are utilized. In certain embodiments, the unique identifier can be utilized as a unique tracking number. In yet other embodiments, the real-time web service call or other electronic request is made to the third-party shared database corresponding to the third-party association described above instead of to the carrier of the particular country.

Proceeding to state 1112, the return label generated by the returns application, a customs form, which may be part of the label or a separate document, and optional instructions for the consumer to utilize the return service are printed by the merchant or the service for the merchant and placed in a package with the merchandise to be shipped to the consumer.

Moving to a state 1114, the purchased merchandise is delivered to the consumer in the first country. In certain embodiments, a carrier transports the merchandise from the merchant, such as from a merchant depot or shipping location, to a carrier service of the first country for delivery to the location of the consumer. After delivery to the consumer, the consumer desires to return at least some of the received merchandise.

Advancing to state 1116, the consumer initiates a return of the merchandise to the merchant. In certain embodiments, this can be done by placing the returns label received with the merchandise on a package for returning the merchandise, which can be the received package if it is not damaged, for example. In other embodiments, the consumer may need to access a returns portion of a website for the merchant or call a call center for the merchant where a call center agent fields the call and opens a returns web application. The customs declaration portion can be completed via the returns application as described above. In other embodiments, certain information, e.g., one or more item descriptions, may be added to the customs portion via handwriting. In certain embodiments, a return merchandise authorization (RMA) may be needed for the return which can be assigned by the merchant website or the call center agent. In certain embodiments, the consumer retains a portion of the return label that may have a tracking number for tracking purposes.

Continuing at state 1118, the consumer sends the package via the carrier service of the first country. In certain embodiments, the carrier service of the first country picks up the package at the location of the consumer or the consumer drops off the package at designated locations, such as a retail outlet, of the carrier service. The return label can have a special indicator that marks the item as a return, and therefore, the carrier service of the first country can accept the package without charging the consumer for any shipping fee or postage.

Advancing at state 1120, the carrier service of the first country delivers the package to a customs service location of the country receiving the package, such as a U.S. Customs and Border Protection location. In certain embodiments, the customs service location is based on one or both of the locations of the consumer and a carrier shipping charge due facility identified on the return label. Based on the information on the customs declaration portion of the return label, the customs service can pass the package directly on to the carrier of the country receiving the package without inspection or assessing any fees.

Moving to state 1122, the package is forwarded from the customs location to the carrier shipping charge due facility, e.g., postage due unit, identified on the return label where the package is weighed and postage calculated. In certain embodiments, the shipping charges are based on the weight of the package, the country of origin and the carrier service type or class of mail. The weight of the package that was sent to the consumer was known when the return label was generated, but the weight is checked here to confirm that the package weighs the same as when it was first shipped to the consumer, for example, if a partial return is made. In certain embodiments, the shipping charge due facility is the closest unit to the merchant or merchant returns depot. In certain embodiments, the shipping charge due amount is added to the return label. In other embodiments, other ways of determining the shipping charge due are envisioned.

Advancing to a decision state 1124, process 1100 determines if the merchant utilized the same U.S. carrier for both origination and return shipments and/or if the merchant has preferred status with the carrier. If the merchant did not utilize the same U.S. carrier for both origination and return shipments or if the merchant does not have preferred status with the carrier, process 1100 proceeds to state 1126 where the shipping charge due is deducted from the merchant account or alternatively, the postage due is charged to a credit card for the merchant.

However, if the merchant did utilize the same U.S. carrier for both origination and return shipments and/or if the merchant has preferred status with the carrier, as determined at decision state 1124, process 1100 continues at state 1128 so as not to charge the merchant. At state 1128, the carrier service of the first country that delivered the package to the customs service is credited for the shipment of the package. Continuing to state 1130, the package is then delivered to the merchant, merchant depot or seller of the merchandise, where it is received by the merchant at state 1132 and the return is complete. Process 1100 ends at state 1134.

In other embodiments, the first country where the consumer is located can be the United States, and the country where the merchant is located is another country, such as Canada. In such a scenario, a carrier or agent, such as the USPS, ships the returns package from the U.S. consumer to the Canada Border Services Agency, which then provides the package to a carrier or agent, such as Canada Post, for delivery to the Canadian merchant. The process can be utilized with other countries as well.

Figure 11B:
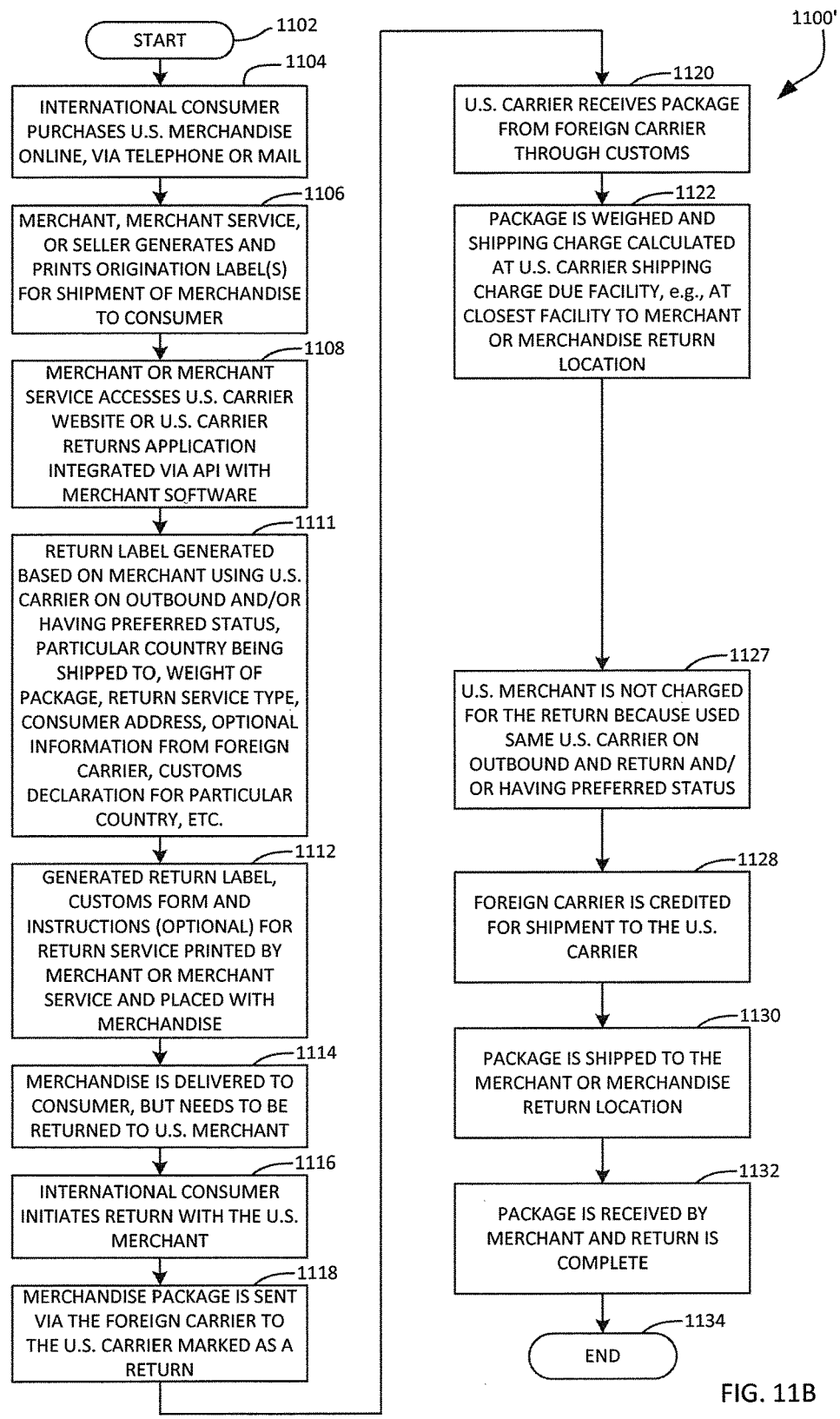
FIG. 11B is a flow diagram of yet another embodiment of a method for processing merchandise returns using a system such as that shown in FIG. 1A, 1B, 1C or 1D.

Referring to FIG. 11B, an example top-level international merchandise returns process 1100' or module for use with an online auction and shopping website or other vendor that can establish a preferred relationship with a carrier will be described. In other embodiments, process 1100' can be used when the merchant utilizes the carrier for both outbound and inbound (returns) shipments. In certain embodiments, process 1100' can offer a returns coverage fee to merchants for every single transaction they send outbound with a preferred carrier, such as the USPS, so that if a return does occur it is covered with no additional costs. Returns coverage can be purchased as the same time the outbound shipping is purchased when a merchant is using priority mail international or express mail international, for example, although other service classes can be utilized in other embodiments. Thus, the outbound shipment and the inbound return can be linked. This service offering can incentivize merchants to grow their outbound volume by decreasing the barriers of international shipping. The returns coverage can be added to the transaction at the point of origination and paid regardless if a return is actually initiated. This service will appeal to different merchants based on the value of the merchandise, the volume of transactions, and their customer base. In yet other embodiments, process 1100' does not charge the merchant for the return shipment when the merchant utilizes the carrier for both outbound and inbound (returns) shipments and/or has a preferred status with the carrier.

In process 1100', an outbound shipping label and a return label are generated by the merchant or seller of the merchandise and included with the merchandise when shipped to the purchaser. Computer implemented steps of the process may be performed on the system 100 shown in FIG. 1A, system 100' shown in FIG. 1B, system 100" shown in FIG. 1C or system 100''' shown in FIG. 1D. Depending on the embodiment, certain steps of the process may be added, rearranged, combined, or removed. Process 1100' implements generation and printing of the return label by the merchant in one country when the merchandise is being shipped to a consumer in another country.

Beginning at a start state 1102, process 1100' continues at state 1104 where a consumer in a first country purchases merchandise from a U.S. merchant or other seller of merchandise via the Internet, world wide web, or other online means, although the purchase can be performed via the telephone, mail, or other means. In other embodiments, the merchant or seller is in a country other than the United States.

Proceeding to state 1106, the merchant, merchant service or seller generates or otherwise prepares and prints origination label(s) for shipment of the merchandise to the consumer or buyer.

Advancing to state 1108, the merchant or a service for the merchant accesses a carrier or agent website for a returns application, or alternatively, accesses a carrier returns application integrated via an API with the merchant's software. In certain embodiments, the returns application is a USPS returns application.

Proceeding to state 1111, the returns application generates a return label based on the merchant information (such as described in conjunction with FIG. 2), the merchant utilizing the carrier for both outbound and inbound (returns) shipments and/or having a preferred status with the carrier, a particular country the merchandise is being shipped to, weight of package, return service type, e.g., mail class, consumer name and address, e.g., including country of origin, optional information from the carrier service of the particular foreign country, customs declaration information, and so forth. In certain embodiments, the customs form is blank at this time. In other embodiments, the customs declaration can be pre-populated in one of at least several possible ways: 1) pre-populate the customs declaration with the exception of the contents section, where the item description needs to be hand written by the shipper for accuracy, 2) pre-populate the customs declaration including the contents section with generic wording such as "returned merchandise" with a value of 0 (zero), or 3) if the origination shipment contains only one item, pre-populate the entire customs declaration based on that item. Process 1100' can optionally initiate a real-time web service call to the carrier service of the particular country, such as their postal service, to obtain a unique identifier for the return label, or other information to be used for the return label. In other embodiments, other electronic ways to obtain information needed for the return label, such as to track the returns package, are utilized. In certain embodiments, the unique identifier can be utilized as a unique tracking number. In yet other embodiments, the real-time web service call or other electronic request is made to the third-party shared database corresponding to the third-party association described above instead of to the first country carrier. Process 1100' charges an outbound shipping fee and a returns coverage fee in certain embodiments, or alternatively, just charges the outbound shipping fee in other embodiments.

Proceeding to state 1112, the return label generated by the returns application, a customs form, which may be part of the label or a separate document, and optional instructions for the consumer to utilize the return service are printed by the merchant or the service for the merchant and placed in a package with the merchandise to be shipped to the consumer.

Moving to a state 1114, the purchased merchandise is delivered to the consumer in the first country. In certain embodiments, a carrier transports the merchandise from the merchant, such as from a merchant depot or shipping location, to a carrier service of the first country for delivery to the location of the consumer. After delivery to the consumer, the consumer desires to return at least some of the received merchandise.

Advancing to state 1116, the consumer initiates a return of the merchandise to the merchant. In certain embodiments, this can be done by placing the returns label received with the merchandise on a package for returning the merchandise, which can be the received package if it is not damaged. In other embodiments, the consumer may need to access a returns portion of a website for the merchant or call a call center for the merchant where a call center agent fields the call and opens a returns web application. The customs declaration portion can be completed via the returns application as described above. In other embodiments, certain information, e.g., one or more item descriptions, may be added to the customs portion via handwriting. In certain embodiments, a return merchandise authorization (RMA) may be needed for the return which can be assigned by the merchant website or the call center agent. In certain embodiments, the consumer retains a portion of the return label that may have a tracking number for tracking purposes.

Continuing at state 1118, the consumer sends the package via the carrier service of the first country. In certain embodiments, the carrier service of the first country picks up the package at the location of the consumer or the consumer drops off the package at designated locations, such as a retail outlet, of the carrier service. The return label can have a special indicator that marks the item as a return, and therefore, the carrier service of the first country can accept the package without charging the consumer for any shipping fee or postage.

Advancing at state 1120, the carrier service of the first country delivers the package to a customs service location of the country receiving the package, such as a U.S. Customs and Border Protection location. In certain embodiments, the customs service location is based on one or both of the locations of the consumer and a carrier shipping charge due facility identified on the return label. Based on the information on the customs declaration portion of the return label, the customs service can pass the package directly on to the carrier of the country receiving the package without inspection or assessing any fees.

Moving to state 1122, the package is forwarded from the customs location to the carrier shipping charge due facility, e.g., postage due unit, identified on the return label where the package is weighed and postage calculated. In certain embodiments, the shipping charges are based on the weight of the package, the country of origin and the carrier service type or class of mail. The weight of the package that was sent to the consumer was known when the return label was generated, but the weight is checked here to confirm that the package weighs the same as when it was first shipped to the consumer, for example, if a partial return is made. In certain embodiments, the shipping charge due facility is the closest unit to the merchant or merchant returns depot. In certain embodiments, the shipping charge due amount can be added to the return label. In other embodiments, other ways of determining the shipping charge due are envisioned.

Advancing to state 1127, in some embodiments, the merchant is not charged if the merchant utilized the same U.S. carrier for both origination and return shipments and/or if the merchant has preferred status with the carrier. In other embodiments, the merchant has prepaid a returns coverage fee at the time the outbound shipping was purchased, and no charge is needed when the return is processed.

Proceeding to state 1128, the carrier service of the first country that delivered the package to the customs service is credited for the shipment of the package. Continuing to state 1130, the package is then delivered to the merchant, merchant depot or seller of the merchandise, where it is received by the merchant at state 1132 and the return is complete. Process 1100' ends at state 1134.

In other embodiments, the first country where the consumer is located can be the United States, and the country where the merchant is located is another country, such as Canada. In such a scenario, a carrier or agent, such as the USPS, ships the returns package from the U.S. consumer to the Canada Border Services Agency, which then provides the package to a carrier or agent, such as Canada Post, for delivery to the Canadian merchant. The process can be utilized with other countries as well.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

CONCLUSION

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A method of processing return merchandise being returned from a user in a first country to a merchant of the merchandise in a second country, the method comprising:
    interconnecting a plurality of user computing devices and a first server using a network, the plurality of user computing devices being in data communication with the network and the first server having a data connection to a first database;
    interconnecting, to the network, a second server including one or more processors and a data connection to a second database;
    receiving, using the one or more processors, identifying information of a user in a first country desiring to return merchandise associated with a merchant;
    accessing, using the one or more processors, address information for a merchandise return location in a second country based on information associated with the merchant;
    generating, using the one or more processors, a first machine readable identifier in accordance with requirements of at least one of the first country or a first country carrier for use in tracking delivery in returning the merchandise based at least on the user information;
    generating, using the one or more processors, a second machine readable identifier in accordance with requirements of at least one of the second country or a second country carrier for use by the second country carrier based at least on information to route the return merchandise;

determining, using the one or more processors, if the second country carrier is a same carrier for both an origination shipment of the merchandise from the merchant and to the merchandise return location in the second country;

determining, using the one or more processors, if a return shipping fee is required for merchandise being returned from the user in the first country to the merchandise return location in the second country and an amount of the return shipping fee if the return shipping fee is required, wherein the determining whether the return shipping fee is required is based at least in part on whether the second country carrier is the same carrier for both the origination shipment of the merchandise and a shipment for the merchandise return;

generating, using the one or more processors, a return label for merchandise being returned from the user in the first country to the merchandise return location in the second country, the return label including the first machine readable identifier, the second machine readable identifier, a customs declaration for the merchandise, and return shipment payment information, wherein the return shipment payment information comprises merchant information encoded to facilitate payment of the return shipping fee if any return shipment payment information is applicable;

storing information from the return label in the first database or second database;

wherein the first country carrier and the second country carrier are different return carriers, compensating the first country carrier for service rendered by the first country carrier, querying the first database or second database storing information from the return label; and determining that a customs service location for the second country received the package with the return label affixed thereupon and did not assess customs fees based on the query that the customs declaration portion of the return label indicates a return and one or more tariff codes indicative of returned merchandise.

2. The method of claim 1, additionally comprising obtaining prepayment of the return shipping fee if the fee is required for the merchandise return.

3. The method of claim 2, wherein an amount of the prepaid return shipping fee is a flat rate amount.

4. The method of claim 2, wherein an amount of the prepaid return shipping fee is a reduced amount from a regular rate for a particular class of shipping service.

5. The method of claim 1 wherein, if the return shipping fee is required and has not been prepaid, the method further comprises:

receiving, using the one or more processors, return label information of the received package from the first database or second database;

computing, using the one or more processors, an amount of return shipping charges due for the received package based on the received return label information; and deducting, using the one or more processors, the return shipping charges due from an account of the merchant or charging a credit card of the merchant.

6. The method of claim 1, wherein generating the first machine readable identifier for use in tracking delivery comprises:

receiving, in response to a real-time web service call using the one or more processors, information from the first country carrier for use in tracking the return merchandise; and producing, using the one or more processors, a tracking code based on the information obtained from the first country carrier.

7. The method of claim 6, wherein the information from the first country carrier is accessed from a database associated with the first country carrier.

8. The method of claim 1, wherein the generated return label is included with the merchandise in the origination shipment.

9. The method of claim 8, additionally comprising receiving information added to the return label by the user, wherein the information is added by the user before the merchandise is returned.

10. The method of claim 1, wherein the merchant comprises a commercial or private seller.

11. The method of claim 1, wherein the second server is part of a postal service computer system.

12. The method of claim 1, wherein the one or more processors perform portions of the method at a merchant website utilizing an application programming interface.

13. A method of processing return merchandise being returned from a user in a first country to a merchant of the merchandise in a second country, the method comprising:

interconnecting a plurality of user computing devices and a first server using a network, the plurality of user computing devices being in data communication with the network and the first server having a data connection to a first database;

interconnecting, to the network, a second server including one or more processors and a data connection to a second database;

receiving, using the one or more processors, identifying information of a user in a first country desiring to return merchandise associated with a merchant;

accessing, using the one or more processors, address information for a merchandise return location in a second country based on information associated with the merchant;

generating, using the one or more processors, a first machine readable identifier in accordance with requirements of at least the first country or a first country carrier for use in tracking delivery in returning merchandise based at least on the user information;

generating, using the one or more processors, a second machine readable identifier in accordance with requirements of the second country or a second country carrier for use by the second country carrier based at least on information to route the return merchandise;

determining, using the one or more processors, that the merchant is not to be charged any shipping fee for a merchandise returns shipment based at least in part on whether a second country carrier is the same carrier for both an origination shipment of the merchandise from the merchant and a return shipment to the merchandise return location in the second country;

in response to the determining, using the one or more processors, generating a return label for merchandise being returned from the user in the first country to the merchandise return location in the second country, the return label including the first machine readable identifier, the second machine readable identifier, a customs declaration for the, and an indicia that the merchant is not to be charged a customs fee for the return shipment; and compensating the first country carrier for service rendered by the first country carrier.

14. The method of claim 13, wherein the customs declaration indicates a return and one or more tariff codes indicative of returned merchandise.

15. The method of claim 14, additionally comprising determining that the customs service location for the second country did not assess customs fees based on the customs declaration indicating the return and one or more tariff codes indicative of returned merchandise.

16. The method of claim 13, wherein generating the first machine readable identifier for use in tracking delivery comprises:
   receiving, in response to a real-time web service call via a computing environment, information from the first country carrier for use in tracking the return merchandise; and
   producing, via a computing environment, a tracking code based on the information obtained from the first country carrier.

17. The method of claim 13, wherein the merchant comprises a commercial or private seller.

18. A method of processing return merchandise being returned from a user in a first country to a merchant of the merchandise in a second country, the method comprising:
   interconnecting a plurality of user computing devices and a first server using a network, the plurality of user computing devices being in data communication with the network and the first server having a data connection to a first database;
   interconnecting, to the network, a second server including one or more processors and a data connection to a second database;
   receiving, using the one or more processors, identifying information of a user in a first country desiring to return merchandise associated with a merchant;
   accessing, using the one or more processors, address information for a merchandise return location in a second country based on information associated with the merchant;
   generating, using the one or more processors, a first machine readable identifier in accordance with requirements of at least the first country or a first country carrier for use in tracking delivery in returning merchandise based at least on the user information;
   generating, using the one or more processors, a second machine readable identifier in accordance with requirements of the second country or a second country carrier for use by the second country carrier based at least on information to route the return merchandise;
   determining, using the one or more processors, if a second country carrier is a same carrier for both an origination shipment of the merchandise from the merchant and a return shipment to the merchandise return location in the second country;
   determining, using the one or more processors, if a return shipping fee is required for merchandise being returned from the user in the first country to the merchandise return location in the second country and an amount of the return shipping fee if the return shipping fee is required, wherein the determining whether the return shipping fee is required is based at least in part on whether the second country carrier is the same carrier for both the origination shipment of the merchandise and the return shipment for the merchandise return;
   generating, using the one or more processors, a return label for merchandise being returned from the user in the first country to the merchandise return location in the second country, the return label including the first machine readable identifier, the second machine readable identifier, a customs declaration for the merchandise, and return shipment payment information, wherein the return shipment payment information comprises merchant information encoded to facilitate payment of the return shipping fee if any return shipment payment information is applicable;
   storing information from the return label in the first database or second database;
   querying the first database or second database storing information from the return label; and
   determining that a customs service location for the second country received the package with the return label affixed thereupon and did not assess customs fees based on the query that the customs declaration portion of the return label indicates a return and one or more tariff codes indicative of returned merchandise.

19. The method of claim 18, wherein the merchant comprises a commercial or private seller.

20. A system for processing return merchandise being returned from a user in a first country to a merchant of the merchandise in a second country, the system comprising:
   a network interconnecting a plurality of user computing devices and a first server having a data connection to a first database, the plurality of user computing devices being in data communication with the network;
   a second server including one or more processors and a data connection to a second database, the second server being interconnected to the network;
   wherein the one or more processors are configured to:
      receive identifying information of a user in a first country desiring to return merchandise associated with a merchant;
      access address information for a merchandise returns location in a second country based on information associated with the merchant;
      perform a real-time web service call via the network to the first server to obtain information for use to track the return merchandise;
      receive, in response to the web service call via the network, the information from the first server for use to track the return merchandise;
      produce a tracking code based on the information obtained from the first server;
      generate a first machine readable identifier in accordance with requirements of at least one of the first country or a first country carrier, for use in tracking delivery in returning merchandise based at least on the user information and the tracking code;
      generate a second machine readable identifier in accordance with requirements of at least one of the second country or a second country carrier for use by the second country carrier based at least on information to route the return merchandise;
      access merchant and buyer information in the first database or second database and determine if a second country carrier is a same carrier for both an origination shipment of the merchandise from the merchant and for the return shipment to the merchandise returns location in the second country;

determine if a return shipping fee is required for merchandise being returned from the user in the first country to the merchandise returns location in the second country and an amount of the return shipping fee if the return shipping fee is required, wherein the determining includes determining that the merchant is not to be charged for the merchandise return based on the merchant accepting a returns coverage fee for the origination shipment of the merchandise or utilizing the same second country carrier for both the origination shipment of the merchandise and the merchandise return shipment based at least on the accessed merchant and buyer information in the first database or second database;

generate a return label for merchandise being returned from the user in the first country to the merchandise returns location in the second country, the return label including the first machine readable identifier, the second machine readable identifier, a customs declaration for the merchandise, and return shipment payment information, if any return shipment information is applicable, wherein information from the return label is stored in the first database or second database;

query the first database or second database storing the information from the return label;

determine that a customs service location for the second country received a package with the return label affixed thereupon and did not assess customs fees, wherein a determination whether to assess custom fees is based on the query of the first database or second database having the return label information;

deduct the return shipping fee due from an account of the merchant or charging a credit card of the merchant if the merchant declines a returns coverage fee for the origination shipment of the merchandise and the second country carrier is not the same carrier for both the origination shipment of the merchandise and the merchandise return shipment based at least on the accessed merchant and buyer information in the first database or second database; and compensate a first country carrier for service rendered by the first country carrier, wherein the first country carrier and the second country carrier are different return carriers, and wherein the first server and the first database correspond with the first country carrier, and the second server and the second database correspond with the second country carrier.

21. The system of claim 20, wherein the return shipment payment information comprises merchant information encoded to facilitate payment of the return shipping fee.

22. The system of claim 20, wherein the one or more processors are additionally configured to obtain prepayment of the return shipping fee if the fee is required for the merchandise return.

23. The system of claim 22, wherein an amount of the prepaid shipping fee is a flat rate amount.

24. The system of claim 22, wherein an amount of the prepaid shipping fee is a reduced amount from a regular rate for a particular class of shipping service.

25. The system of claim 20 wherein, if the return shipping fee is required and has not been prepaid, the one or more processors are additionally configured to:
query the first database or second database for return label information of the received package;
compute an amount of return shipping charges due for the received package based on the queried return label information; and
deduct the return shipping charges due from an account for the merchant or charge a credit card for the merchant.

26. The system of claim 20, wherein the second server is part of a postal service computer system.

27. The system of claim 20, wherein the first machine readable identifier and/or the second machine readable identifier are based on one of a S10 international barcode or an intelligent mail package barcode (IMpB).

28. The system of claim 20, wherein the second server includes a web application.

* * * * *

UNITED STATES PATENT AND TRADEMARK OFFICE
CERTIFICATE OF CORRECTION

PATENT NO. : 10,430,753 B2
APPLICATION NO. : 14/568041
DATED : October 1, 2019
INVENTOR(S) : Shea R. Felix Page 1 of 1

It is certified that error appears in the above-identified patent and that said Letters Patent is hereby corrected as shown below:

In the Claims

In Column 31, at Line 1, in Claim 13, change "the," to --the merchandise,--.

Signed and Sealed this
Fourteenth Day of January, 2020

Andrei Iancu
*Director of the United States Patent and Trademark Office*